(12) United States Patent (10) Patent No.: US 8,816,612 B2
Suzuki (45) Date of Patent: Aug. 26, 2014

(54) CONTROLLER FOR MULTI-PHASE ROTARY DEVICE

(71) Applicant: Denso Corporation, Kariya (JP)

(72) Inventor: Takashi Suzuki, Obu (JP)

(73) Assignee: Denso Corporation, Kariya (JP)

( * ) Notice: Subject to any disclaimer, the term of this patent is extended or adjusted under 35 U.S.C. 154(b) by 22 days.

(21) Appl. No.: 13/856,583

(22) Filed: Apr. 4, 2013

(65) Prior Publication Data

US 2013/0264974 A1 Oct. 10, 2013

(30) Foreign Application Priority Data

Apr. 6, 2012 (JP) .................................. 2012-87813

(51) Int. Cl.
*H02P 23/00* (2006.01)
*H02P 25/00* (2006.01)
*H02P 27/08* (2006.01)

(52) U.S. Cl.
CPC ..................................... *H02P 27/08* (2013.01)
USPC .......................................... 318/139; 318/811

(58) Field of Classification Search
CPC ....................................................... H02P 27/08
USPC ................................................. 318/139, 811
See application file for complete search history.

(56) References Cited

U.S. PATENT DOCUMENTS

| 5,831,804 A | 11/1998 | Vilou |
| 8,686,673 B2 * | 4/2014 | Matsuki et al. ........... 318/400.02 |
| 2012/0249037 A1* | 10/2012 | Iwamiya ........................ 318/459 |
| 2012/0319630 A1* | 12/2012 | Li et al. ...................... 318/400.3 |

FOREIGN PATENT DOCUMENTS

| JP | 2007-152994 | 6/2007 |
| JP | B2-4715677 | 7/2011 |

* cited by examiner

*Primary Examiner* — Erick Glass
(74) *Attorney, Agent, or Firm* — Nixon & Vanderhye PC

(57) ABSTRACT

A controller includes: an inverter having switching devices for converting by a PWM method and supplying an electric power to a multi-phase rotary device; a duty calculator calculating a duty command value with To; a pseudo duty calculator calculating a N-th update duty value based on N-th and (N−1)-th duty command values according to a ratio of To/Tr with a linear compensation method; a comparator comparing the update duty value with a carrier wave to generate an on-off signal of each switching device; and a detector detecting current of each phase with To. The duty calculator changes an average voltage of each phase to make an on-state time of a detection side switching device equal to or longer than minimum. When the on-state time at one phase is smaller than minimum, the pseudo duty calculator outputs a pseudo duty value to detect the current of other phases.

3 Claims, 26 Drawing Sheets

| VOLT VECTOR | | ON-STATE MOS | | |
|---|---|---|---|---|
| | | U PHASE | V PHASE | W PHASE |
| 0-VOLT VECTOR | V0 | L-MOS 24 | L-MOS 25 | L-MOS 26 |
| EFF-VOLT VECTOR | V1 | U-MOS 21 | L-MOS 25 | L-MOS 26 |
| | V2 | U-MOS 21 | U-MOS 22 | L-MOS 26 |
| | V3 | L-MOS 24 | U-MOS 22 | L-MOS 26 |
| | V4 | L-MOS 24 | U-MOS 22 | U-MOS 23 |
| | V5 | L-MOS 24 | L-MOS 25 | U-MOS 23 |
| | V6 | U-MOS 21 | L-MOS 25 | U-MOS 23 |
| 0-VOLT VECTOR | V7 | U-MOS 21 | U-MOS 22 | U-MOS 23 |

CONTROLLER FOR MULTI-PHASE ROTARY DEVICE

CROSS REFERENCE TO RELATED APPLICATION

This application is based on Japanese Patent Application No. 2012-87813 filed on Apr. 6, 2012, the disclosure of which is incorporated herein by reference.

TECHNICAL FIELD

The present disclosure relates to a controller for controlling a drive of a multi-phase rotary device.

BACKGROUND

Conventionally, a controller for driving a multi-phase rotary device with a PWM (pulse width modulation) control method is well known. The controller converts a command voltage, which is calculated according to current to be supplied to each phase element in the multi-phase rotary device from an electric power converter, to a duty command value. Thus, the controller controls a switching device in the electric power converter to switch on and off.

Here, a current detector for detecting current to be supplied to each phase element in the multi-phase rotary device may includes a Shunt resistor for detecting current flowing through a switching device on a high electric potential side or a low electric potential side in the electric power converter. When the current detector is the Shunt resistor, it is necessary to take sufficient current detection time including convergence time of ringing phenomenon when the switching device switches on and off.

For example, a controller for a three-phase rotary device in JP-B-4715677 selects one of current detecting methods in order to secure the current detection time much longer among two methods. One current detecting method provides to detect current in a period, in which all of switching devices of three phases disposed on a side connecting to the current detector turns on. The other current detecting method provides to detect current in a period, in which two of switching devices corresponding to two phases disposed on a side connecting to the current detector turns on. In accordance with the selected current detecting method, the average voltage of the duty command value is modified to shift to the low voltage side or the high voltage side, so that the voltage utilization coefficient is improved. Further, the current detection time of the multi-phase rotary device is secured.

Here, in order to stabilize the control of the multi-phase rotary device and to reduce the noise, the vibration and the torque ripple in the PWM control, it is preferable to bring the calculation cycle of the duty command value closer to the cycle of the PWM carrier wave. However, in this case, when the interruption process of the control process is executed very often, i.e., when the number of interruption process times increases, the process load also increases. Thus, when multiple duty update values are generated according to the duty command value in one cycle of the control process of the duty command value, the process load is reduced, and the control of the multi-phase rotary device is stabilized.

In the prior art of JP-B-4715677, the update of the duty value is not taken into consideration. Accordingly, even if the duty command value is modified to secure the current detection time sufficiently, the current detection time is not always sufficiently secured with respect to the update duty command value, which is generated after the duty command value is modified.

SUMMARY

It is an object of the present disclosure to provide a controller for a multi-phase rotary device. The controller stably controls the multi-phase rotary device with reducing a process load. Further, current detection time in the controller is sufficiently secured.

According to an example aspect of the present disclosure, a controller for a multi-phase rotary device includes: an electric power inverter for converting an electric power of a direct current power source by a pulse width modulation control method and for supplying a converted electric power to the multi-phase rotary device, the electric power inverter including a plurality of switching devices, which have a high voltage side switching device and a low voltage side switching device connected to each other in a bridge connection manner; a control calculation device including: a duty command device for calculating a duty command value, which relates to the pulse width modulation control method, with a predetermined calculation period; and a pseudo duty calculation device for calculating a update duty value based on the duty command value with an update period, which has a frequency M times larger than the calculation period, the M indicative of an integer equal to or larger than two, the control calculation device outputting the update duty value corresponding to a command voltage of the multi-phase rotary device; a carrier wave comparison device for comparing the update duty value with a carrier wave of the pulse width modulation control method and for generating an on-off signal of each switching device; and a current detection device for detecting current of each phase to be supplied to the multi-phase rotary device from the electric power inverter with the calculation period, the current detection device arranged between the low voltage side switching device and a negative terminal of the direct current power source or between the high voltage side switching device and a positive terminal of the direct current power source. The duty command device changes an average voltage of each phase corresponding to the duty command value so that an on-state time of a detection side switching device corresponding to the duty command value is equal to or longer than a minimum detection time for detecting the current of each phase with the current detection device. The detection side switching device is provided by one of the switching devices disposed on a current detection device side. The pseudo duty calculation device calculates the update duty value, which corresponds to a N-th duty command value, based on the N-th duty command value and a (N−1)-th duty command value in accordance with a ratio between the update period and the calculation period with a linear compensation method. The duty command device calculates the duty command value N times. The N indicates a natural number. The pseudo duty calculation device outputs a pseudo duty value when the on-state time of the detection side switching device of at least one of phases, which corresponds to the update duty value, is smaller than the minimum detection time. The pseudo duty value is prepared by changing the update duty value so as to detect the current of all phases other than the at least one of phases.

In the above controller, since the update duty value is calculated at the update period equal to one-M-th of the calculation period, the frequency of comparison between the update duty value and the carrier wave increases without increasing the interruption process of the duty command value. Further, the update duty value is calculated by the linear compensation method, which requires small calculation load. Accordingly, the controller can stably control the rotary device with reducing the calculation load.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
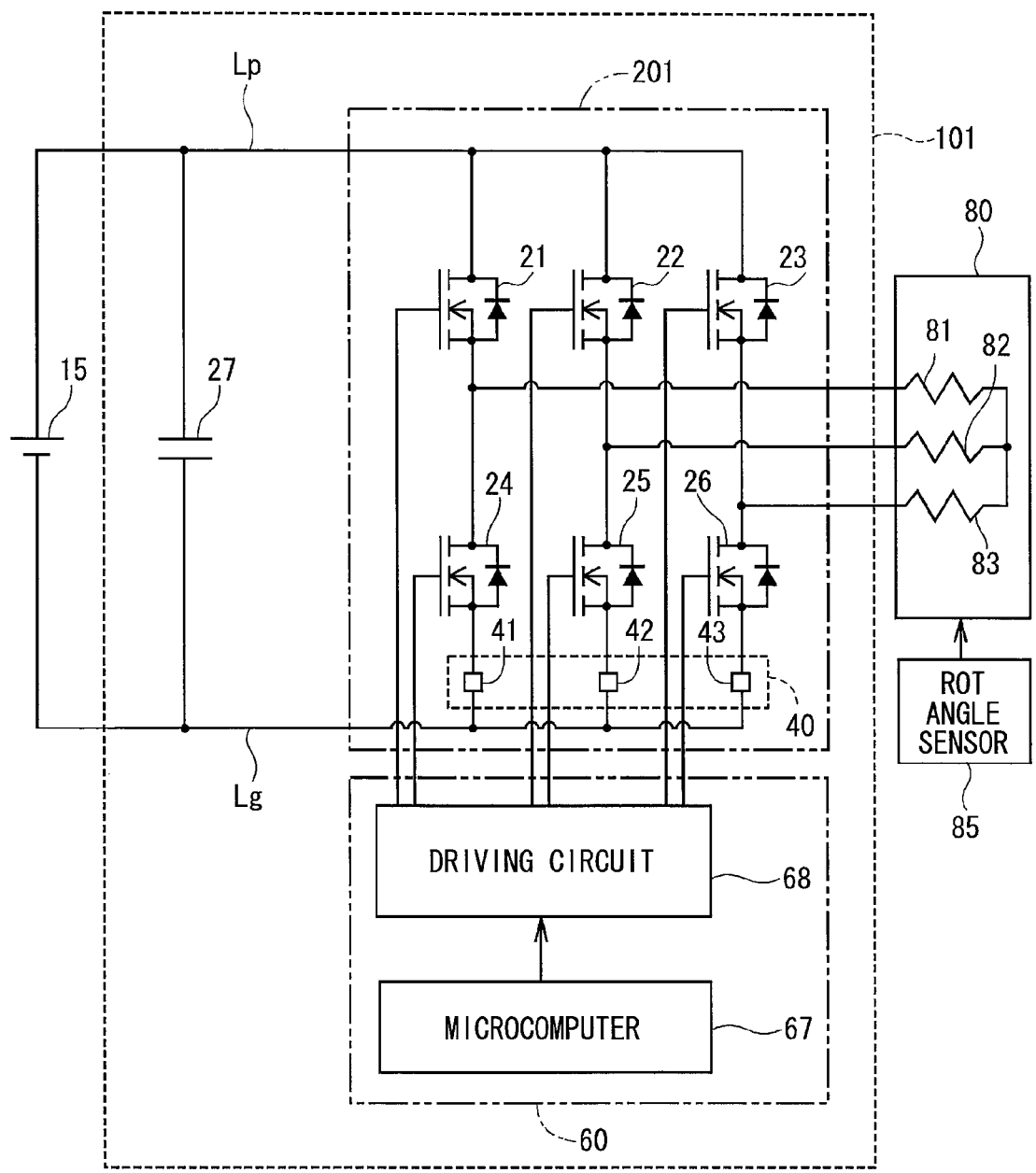
FIG. 1 is a diagram showing a controller for a three-phase rotary device according to first to fifth embodiments.

As shown in FIG. 1, a ECU (electric control unit) 101 according to a first embodiment is a controller for controlling a drive of a motor 80, which functions as a multi-phase rotary device. The motor 80 according to the present embodiment is a three-phase brushless motor. For example, the motor is used as a steering assist motor for assisting steering operation of a driver in an electric power steering system of a vehicle. A rotation angle of the motor 80 detected by a rotation angle sensor 85 is converted to an electric angle $\theta$. Then, the electric angle $\theta$ is input into a control device 60 of the ECU 101.

The ECU 101 includes an inverter 201, a capacitor 27, Shunt resistors 41-43 and the control device 60.

The inverter 201 includes six switching devices 21-26, which are connected together in a bridge manner. The inverter 201 converts the electric power from a battery 15 as a direct current power source by a PWM control method, and then, the converted power is supplied to the motor 80. In the present embodiment, the switching device 21-26 is a MOSFET (metal oxide semiconductor field effect transistor).

Thus, the switching devices 21-26 are referred as the MOSFET 21-26. Further, the switching device 21-23 on the high electric potential side is referred as an upper MOSFET 21-23, and the switching device 24-26 on the low electric potential side is referred as a lower MOSFET 24-26.

The inverter 201 is connected to a positive side of the battery 15 via a power source line Lp. Further, the inverter 201 is connected to a negative side of the battery 15 via a ground line Lg.

The drain of the upper MOSFET 21-23 is connected to the power source line Lp. Further, the source of the upper MOSFET 21-23 is connected to the drain of the lower MOSFET 24-26. The source of the lower MOSFET 24-26 is connected to the ground line Lg via the Shunt resistor 41-43. A connection point between the upper MOSFET 21-23 and the lower MOSFET 24-26 is connected to one end of the U-phase coil 81, the V-phase coil 82, or the W phase coil 83 in the motor 80. A signal generated in a carrier wave comparison device 57 is input into the source of each MOSFET 21-26, so that a switch between the source and the drain turns on and off.

The capacitor 27 is connected between the power source line Lp and the ground line Lg. The capacitor 27 accumulates charges so that the capacitor 27 assists electric power supply to the MOSFET 21-26. Alternatively, the capacitor 27 limits a noise component such as a surge current.

The Shunt resistor 41-43 as the current detecting device detects current, which is to be supplied to each phase coil 81-83 in the motor 80 from the inverter 60, at predetermined intervals, which are the same cycle of the calculation period of a control calculation device 50. Then, the detected current is transferred to the control device 60. Here, in FIG. 1, the Shunt resistors 41-43 are integrally defined as a Shunt resistor 40.

In the present embodiment, each Shunt resistor 41-43 is formed between the lower MOSFET 24-26 and th ground line Lg. Accordingly, the lower MOSFET 24-26 corresponds to the switching device on the detection side.

The control device 60 includes a micro computer 67 and a driving circuit 68. The control device 60 controls a whole of the ECU 101.

Figure 2A:
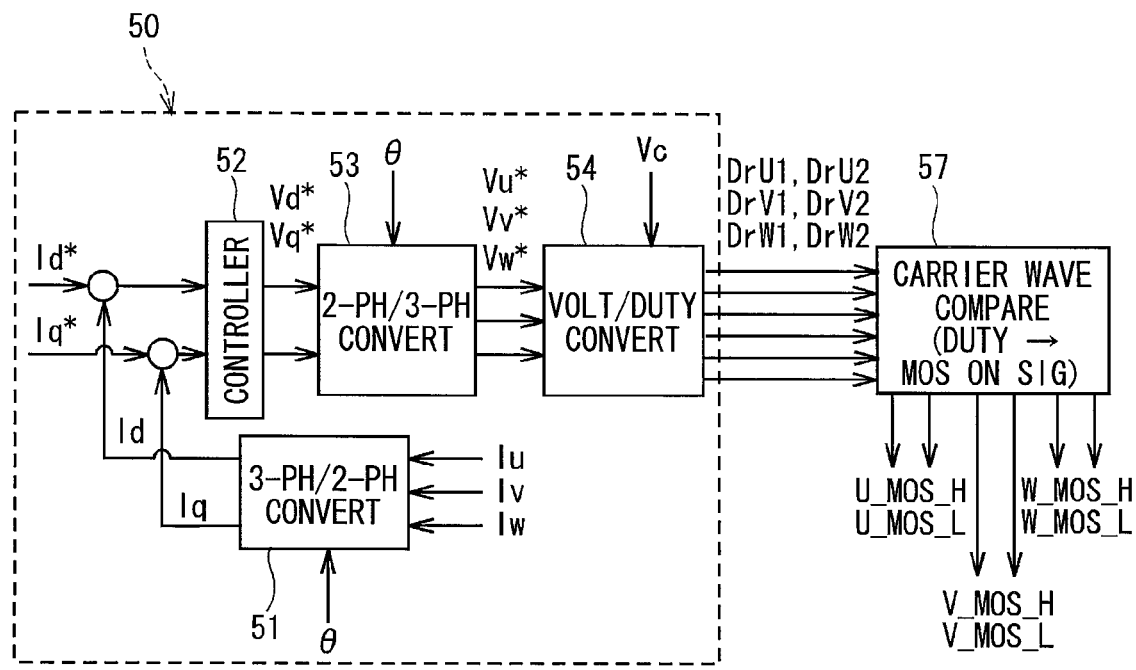
FIG. 2A is a block diagram showing a process in a control device.
Figure 2B:
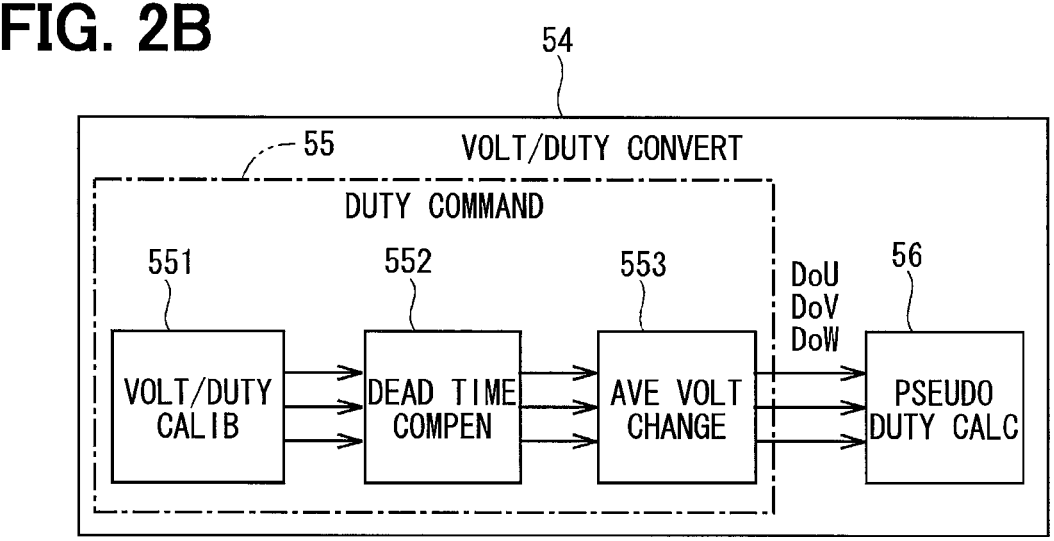
FIG. 2B is a block diagram showing a voltage duty converter.

As shown in FIG. 2, the control device 60 further includes a three-phase/two-phase converter device 51, a control element 52, a two-phase/three-phase converter device 53, a voltage duty converter 54 and a carrier wave comparison device 57. Here, the three-phase/two-phase converter device 51, the control element 52, the two-phase/three-phase converter device 53, and the voltage duty converter 54 provide the control calculation device 50.

The three-phase/two-phase converter device 51 calculates current Iu, Iv, Iw of each phase according to the current detection value detected by the Shunt resistor 41-43. Based on the calculated current Iu, Iv, Iw and the electric angle θ, the three-phase/two-phase converter device 51 calculates a d-axis current detection value Id and a q-axis current detection value Iq.

The control device 52 calculates a current deviation ΔId between a d-axis command current value Id* and the d-axis current detection value Id and a current deviation ΔIq between a q-axis command current value Iq* and the q-axis current detection value Iq with executing a current feedback control method. Further, the control device 52 calculates a command voltage values Vd*, Vq*, each of which converges the current deviation ΔId, ΔIq to be zero.

The two-phase/three-phase converter device 53 calculates three-phase command voltages Vu*, Vv*, Vw* based on the command voltages Vd*, Vq* and the electric angle θ, which are calculated by the control device 52.

The voltage duty converter 54 converts the three-phase command voltages Vu*, Vv*, Vw* to the duty values relating to applied voltages to the coils 81-83 with referenced to the capacitor voltage Vc, and then, inputs the duty values into the carrier wave comparison device 57.

The voltage duty converter 54 includes: a duty command device 55 for instructing the duty command values DoU, DoV, DoW relating to the PWM control of the inverter 201; and a pseudo duty calculation device 56 for calculating the update duty value based on the duty command value.

The duty command device 55 further includes: a voltage duty conversion device 551 for converting the command voltage to the duty ratio; a dead time compensation device 552 for setting the dead time; and an average voltage changing device 553 for executing the average voltage changing process. The duty command device 55 calculates the duty command value at predetermined calculation intervals.

The pseudo duty calculation device 56 calculates the update period of the update duty value, which has a frequency M times larger than the calculation interval. Here, the factor of M is an integer equal to or larger than two. In the present embodiment, the factor of M is two. The calculation interval and the update period will be explained later.

The carrier wave comparison device 57 compares the update duty value DrU1, DrV1, DrW1, DrU2, DrV2, DrW2 output from the voltage duty converter 54 with the PWM standard signal as a carrier signal of the carrier wave, and further, generates an on/off signal of each MOSFET 21-26 in the inverter 201. In the present embodiment, the carrier wave is a triangle wave having an isosceles triangle shape so that a rising rate is equal to a falling rate.

Next, a general PWM control method will be explained with reference to FIGS. 3 to 5.

Figures 3, 5:
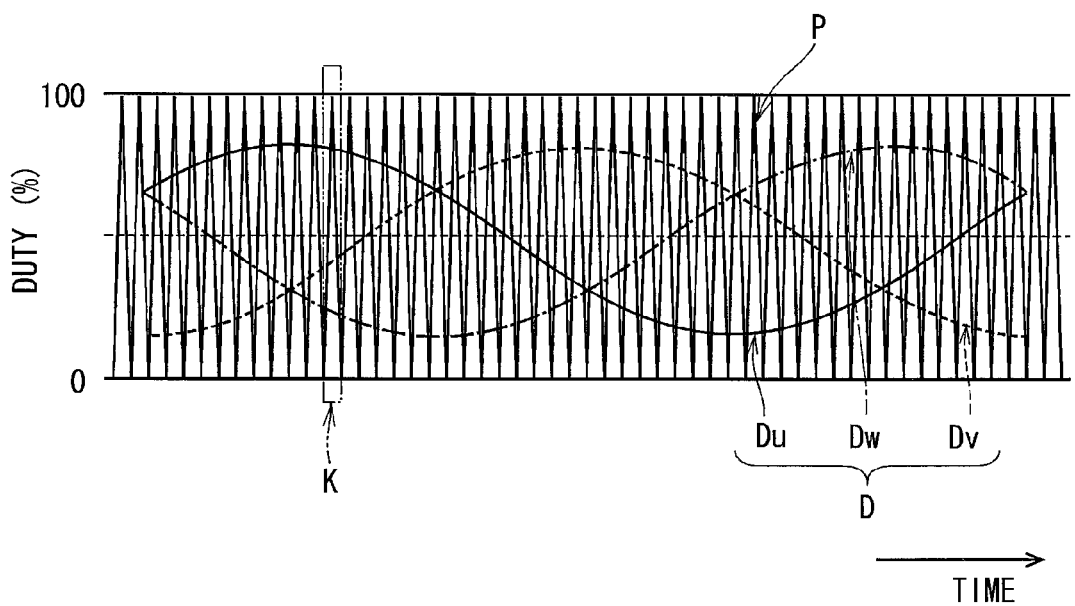
FIG. 3 is a graph showing a PWM control method.
FIG. 5 is a diagram showing a voltage vector pattern.

As shown in FIG. 3, the duty command signal D includes a U-phase duty command signal Du, a V-phase duty command signal Dv and a W-phase duty command signal Dw, which are sine wave signals having the substantially same amplitude and a different phase. The phases of the U-phase duty command signal Du, the V-phase duty command signal Dv and the W-phase duty command signal Dw are different from each other by 120 degrees. The average between the maximum value of the duty command signal D and the minimum value of the duty command signal D corresponds to the duty of 50%.

The PWM standard signal P is a triangle wave signal. In the present embodiment, the frequency of the PWM standard signal P is 20 kHz, and the period of the signal P is 50 microseconds. Thus, the period of the signal P is much shorter than the period of the sine wave in the duty command signal D. Here, FIG. 3 schematically shows the PWM standard signal P so that the number of cycles of the PWM standard signal P within one period of the duty command signal D may be different. Actually, the frequency of the PWM standard signal P is much lager than in FIG. 3, i.e., the number of cycles of the PWM standard signal P within one period of the duty command signal D is much larger than in FIG. 3.

Figure 4:
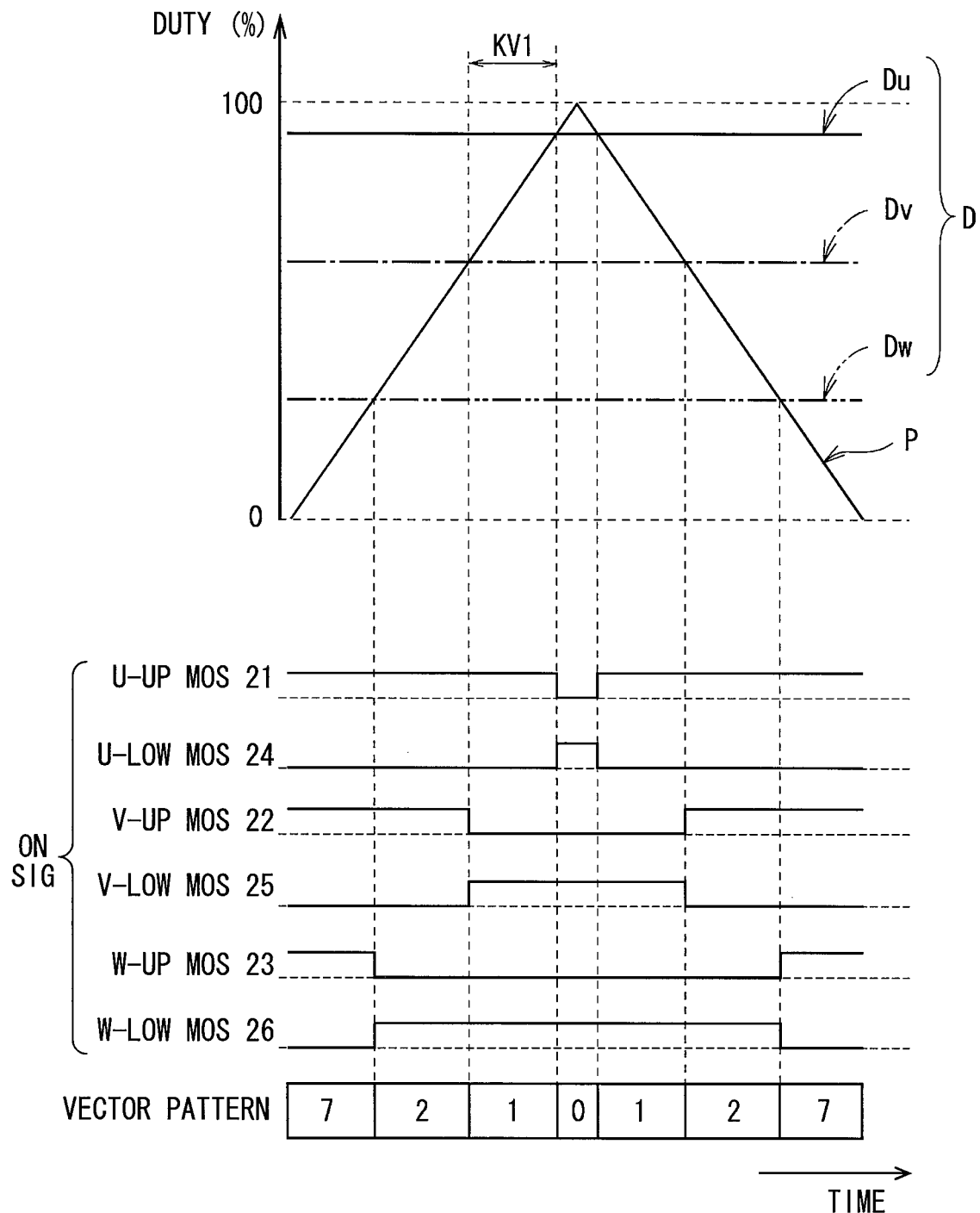
FIG. 4 is a diagram showing the PWM control method.

FIG. 4 shows a partially enlarged view of region K in FIG. 3. In FIG. 4, the magnitude relationship between the PWM standard signal P and the duty command signal D is schematically shown.

In the PWM control process, each phase duty command signal Du, Dv, Dw is compared with the PWM standard signal P, and then, the on/off signal of each MOSFET 21-26 is generated. In the present embodiment, in a section that the PWM standard signal P exceeds each phase duty command signal Du, Dv, Dw, the upper MOSFET 21-23 turns off, and the lower MOSFET 24-26 turns on. Further, in a section that each phase duty command signal Du, Dv, Dw exceeds the PWM standard signal P, the upper MOSFET 21-23 turns on, and the lower MOSFET 24-26 turns off. Thus, the upper MOSFET 21-23 and the lower MOSFET 24-26 in each phase oppositely turn on and off.

Specifically, for example, in the section KV1, the PWM standard signal P is disposed lower than the U-phase duty command signal Du, and higher than the V-phase duty command signal Dv and the W-phase duty command signal Dw. Accordingly, in the U-phase, the upper MOSFET 21 turns on, and the lower MOSFET 24 turns off. In the V-phase and the W-phase, the upper MOSFET 22, 23 turns on, and the lower MOSFET 25, 26 turns on.

As shown in FIG. 5, the voltage vector pattern indicative of the on/off state of the MOSFET in each phase includes eight patterns. During the zero voltage vector period of V0, all of the lower MOSFETS 24-26 in three phases turn on. During the zero voltage vector period of V7, all of the upper MOSFETS 21-23 in three phases turn on. Accordingly, during the zero voltage vector period V0 or the zero voltage vector period of V7, the voltage is not applied to each phase coil 81-83. On the other hand, during the effective voltage vector periods V1-V6, one or two of the lower MOSFETS 24-26 in three phases turn on, so that the voltage is applied to each phase coil 81-83.

Next, the average voltage changing process of the duty command value executed by the duty command device 55 will be explained with reference to FIGS. 6 to 9. The average voltage changing process is disclosed in JP-B-4175677 (corresponding to U.S. Pat. No. 5,831,804).

In the average voltage changing process, one of two methods for detecting the current to be supplied to the motor 80 from the inverter 60 at each phase is selected. A first method provides to detect the current flowing through the Shunt resistors 41-43 at three phases in the zero voltage vector generation period. Here, the zero voltage is referred as V0, and in the zero voltage vector generation period, all of the lower MOSFETS 24-26 at three phases turn on. The first method is defined as a three-phase current detecting method.

A second method provides to detect the current flowing through two Shunt resistors at two phases corresponding to the low MOSFETS, which turn on, in a period, in which two lower MOSFETS at two phases turn on, and one lower MOSFET at one phase turns off. Further, the second method provides to estimates the current flowing through one Shunt resistor at the one phase corresponding to the lower MOSFET, which turns off, according to the Kirchhoff law. The second method is defined as a two-phase current detecting method. The two-phase current detecting method is executed in the V1 voltage vector period when the current estimating phase is the U phase. The two-phase current detecting method is executed in the V3 voltage vector period when the current estimating phase is the V phase. The two-phase current detecting method is executed in the V5 voltage vector period when the current estimating phase is the W phase. Thus, the two-phase current detecting method is executed in an odd number voltage vector generation period.

In the average voltage changing process, one of the three-phase current detecting method and the two-phase current detecting method is selected in order to secure a longer current detection period. Further, the average voltage of the duty command value is displaced (i.e., shifted) to the lower voltage side or the higher voltage side. The detail of the average voltage changing process will be explained with reference to the flowchart in FIG. 6. In FIGS. 6, 15, 17, 21, 23, and 27, the word "S" indicates a step.

Figure 6:
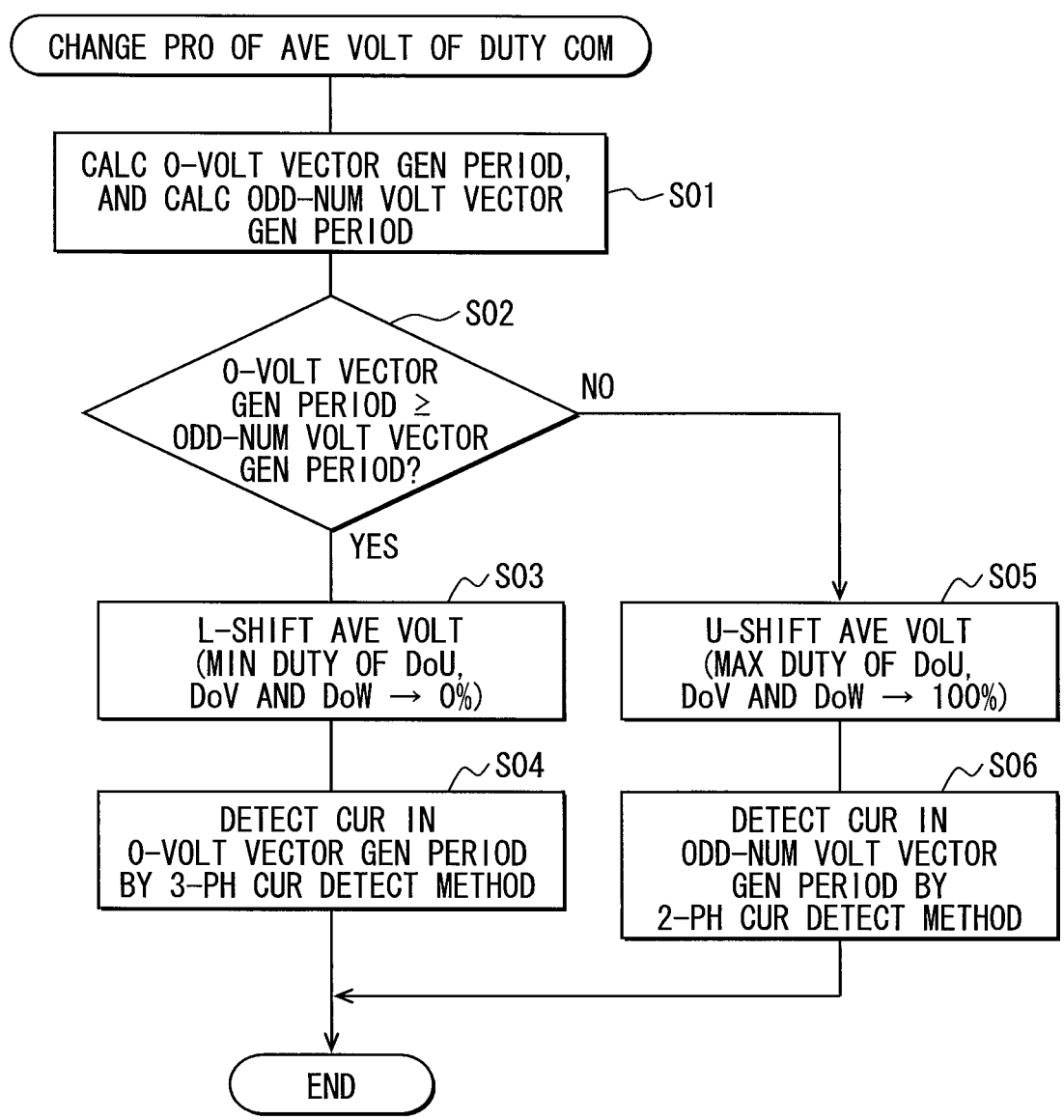
FIG. 6 is a flowchart showing a change process of an average voltage for a duty command value.

In step S01 of FIG. 6, the zero voltage vector generation period, which is a sum of the V0 period and the V7 period, is calculated. Further, the odd number voltage vector generation periods, i.e., the V1, V3 and V5 voltage vector generation periods, are calculated. At step S02, the zero voltage vector generation period is compared with the odd number voltage vector generation periods. When the zero voltage vector generation period is longer than or equal to the odd number voltage vector generation periods, i.e., when the determination in step S02 is "YES," it goes to step S03. At step S03, the average voltage of the duty command value is shifted to the low voltage side. Then, in step S04, the current is detected by the three-phase current detecting method in the zero voltage vector generation period.

Figure 7:
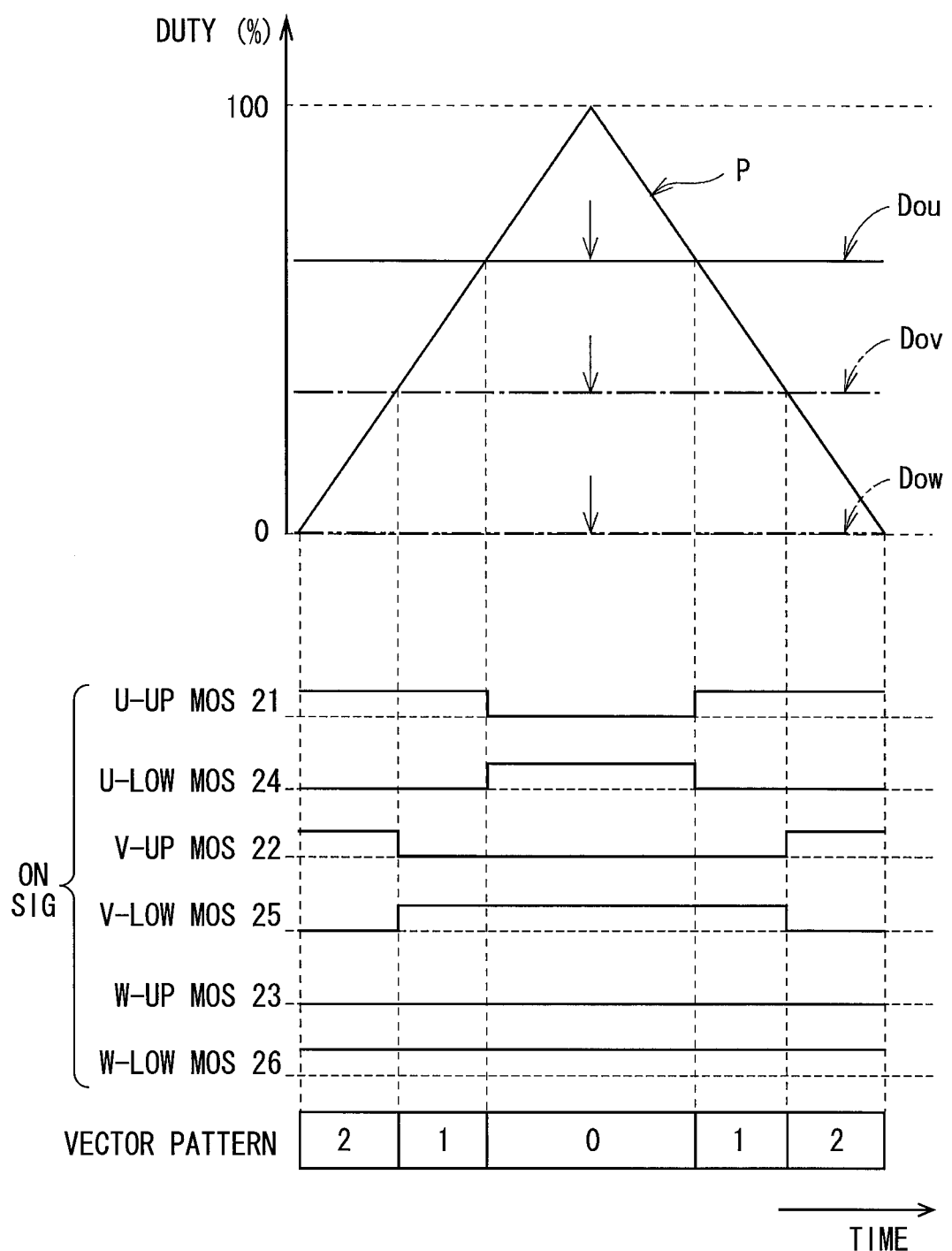
FIG. 7 is a diagram showing a lower shift process for detecting current by a three-phase current method.
Figure 9:
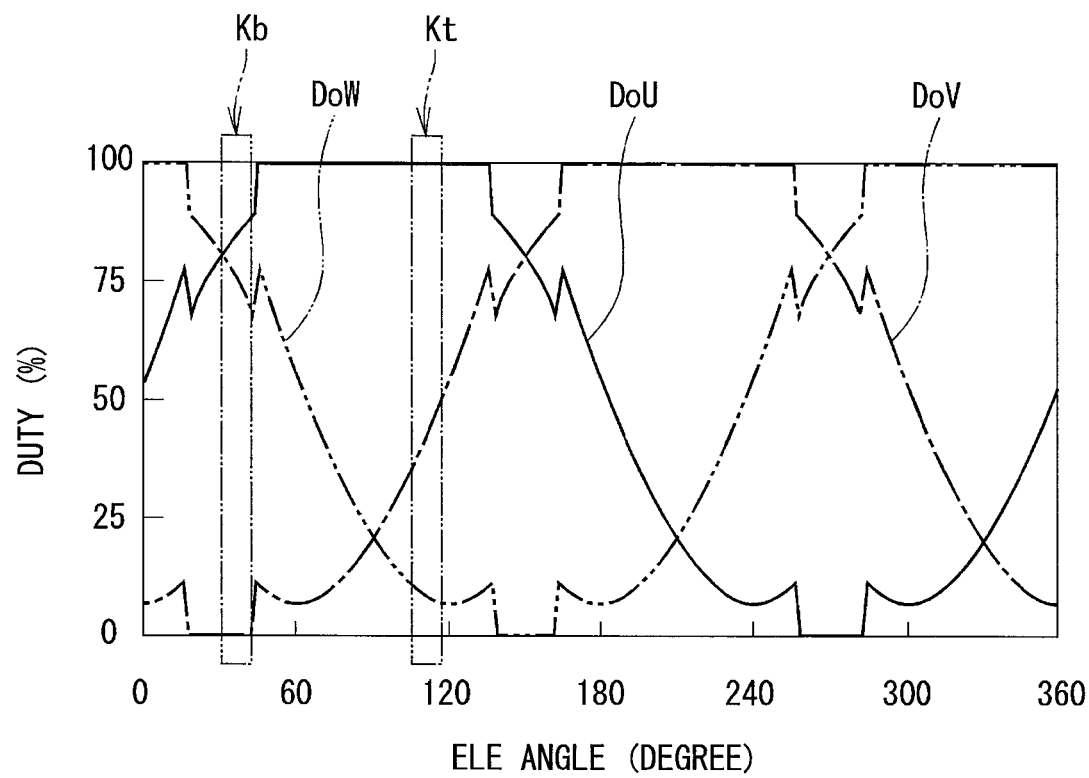
FIG. 9 is a graph showing a waveform of the duty command value processed in the change process of the average voltage.

Here, the process for shifting to the low voltage side in the average voltage changing process of the duty command value will be explained with reference to FIGS. 7 and 9. For example, at point Kb in FIG. 9, the duty command values of three phases are arranged in descending order of the U phase, the V phase and the W phase. In this case, as shown in FIG. 9, the average voltage is shifted to the low voltage side in the lower shift step in order to set the duty ratio of the W phase corresponding to the minimum duty command value to be zero. Thus, the duty ratio of the U phase corresponding to the maximum duty command value is reduced. Further, the zero voltage vector generation period of V7 before shifting the average voltage is added to the zero voltage vector period of V0, so that the zero voltage vector period of V0 becomes maximum.

When the zero voltage vector generation period is shorter than the odd number voltage vector generation periods, i.e., when the determination in step S02 is "NO," it goes to step S05. At step S05, the average voltage of the duty command value is shifted to the high voltage side. Then, in step S06, the current is detected by the two-phase current detecting method in the odd number voltage vector generation periods.

Figure 8:
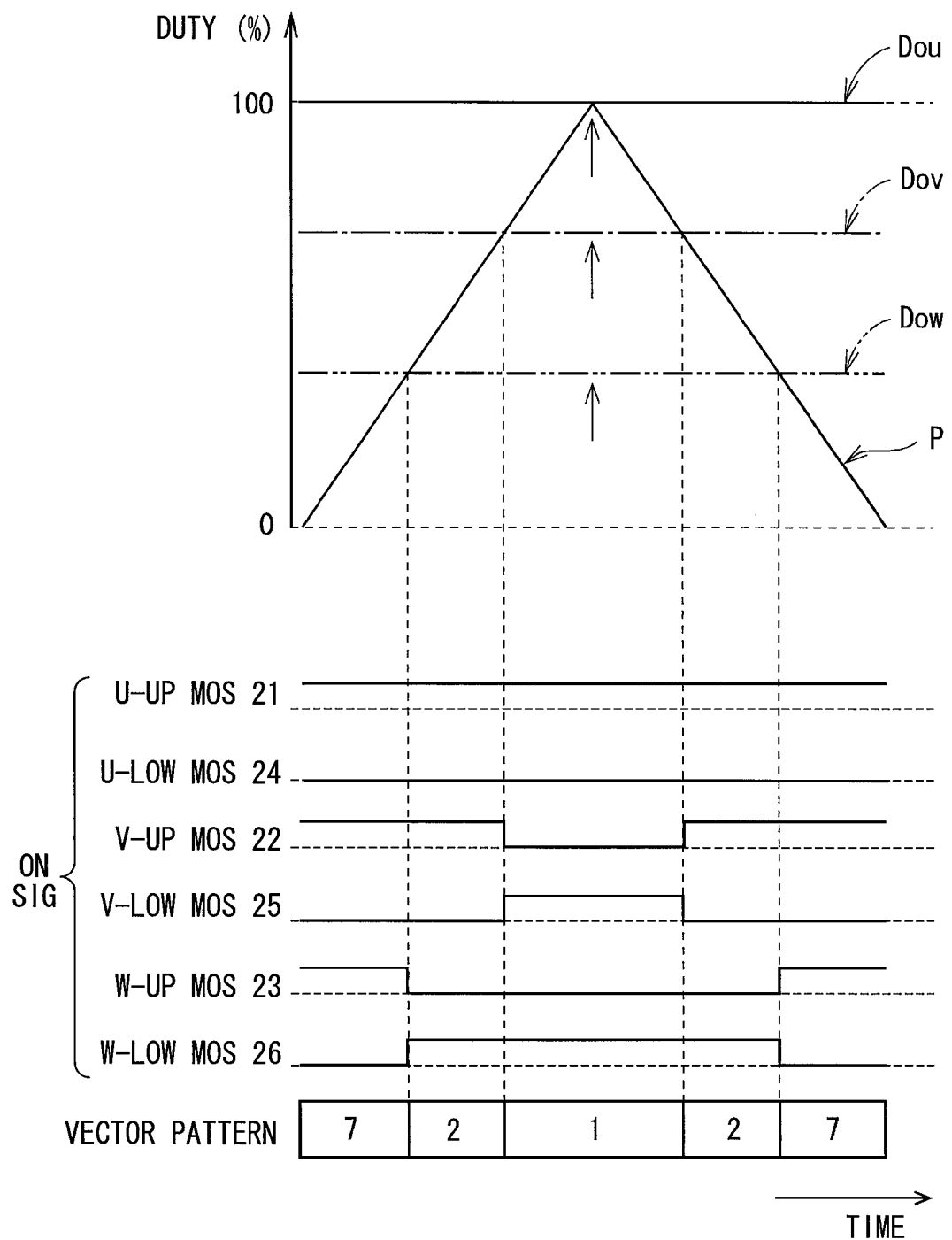
FIG. 8 is a diagram showing an upper shift process for detecting current by a two-phase current method.
Figure 10:
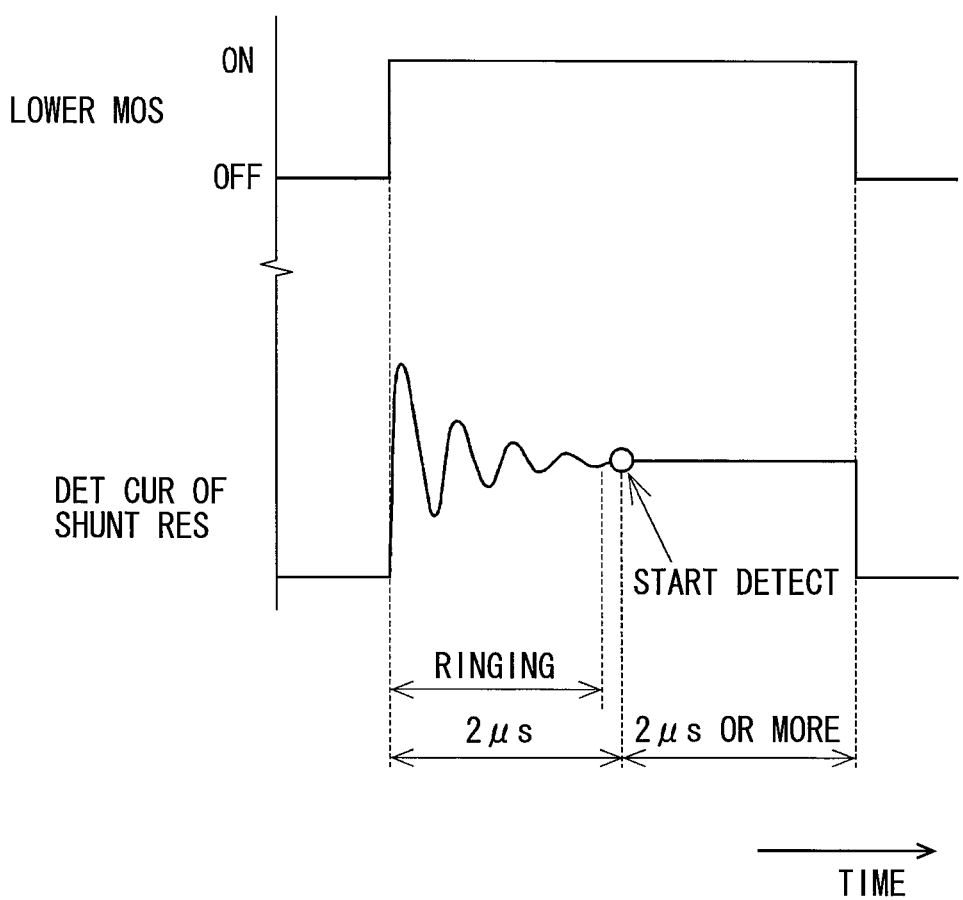
FIG. 10 is a diagram showing a ringing phenomenon in a Shunt resistor.

Here, the process for shifting to the high voltage side in the average voltage changing process of the duty command value will be explained with reference to FIGS. 8 and 9. For example, at point Kt in FIG. 9, the duty command values of three phases are arranged in descending order of the U phase, the V phase and the W phase. In this case, as shown in FIG. 10, the average voltage is shifted to the high voltage side in the upper shift step in order to set the duty ratio of the U phase corresponding to the maximum duty command value to be 100%. Thus, the zero voltage vector period of V0 before shifting the average voltage is deleted, so that the V1 voltage vector periods disposed on both sides of the zero voltage vector period of V0 are integrated to a continuous one V1 voltage vector period. As a result, the current is detected in the continuous one V1 voltage vector period.

Thus, the average voltage changing process of the duty command value provides to secure the current detection time. Here, the average voltage changing process relates to the duty command value.

On the other hand, the ECU 101 according to the present embodiment generates the update duty value based on the duty command value in order to reduce the noise and the vibration of the motor 80 and to stabilize the motor operation. Further, the ECU 101 executes the process for securing the current detecting time with respect to the update duty value. The pseudo duty calculation device 56 executes these processes.

The pseudo duty calculation device 56 calculates the update duty value based on the duty command value according to the linear compensation method. The device 56 determines whether the current detection time is sufficiently secured with respect to the calculated update duty value. If the current detection time is not sufficiently secured, the device 56 corrects the update duty value to be the pseudo duty value.

Here, the minimum detection time for detecting the current with using the Shunt resistors 41-43 will be explained with reference to FIGS. 10 to 12.

As shown in FIG. 10, the detection current flowing through the Shunt resistor 41-43 exhibits the ringing phenomenon just after the low MOSFET switches from the off state to the on-state. Thus, after the low MOSFET turns on, the detection starts when two microseconds has elapsed. Here, the ringing phenomenon converges at the detection starting time when two microseconds has elapsed since the low MOSFET turns on. Further, it is necessary to secure the detection time equal to or longer than two microseconds. Therefore, the minimum time interval, in which the MOSFET continues to turn on, is four microseconds.

Figure 11:
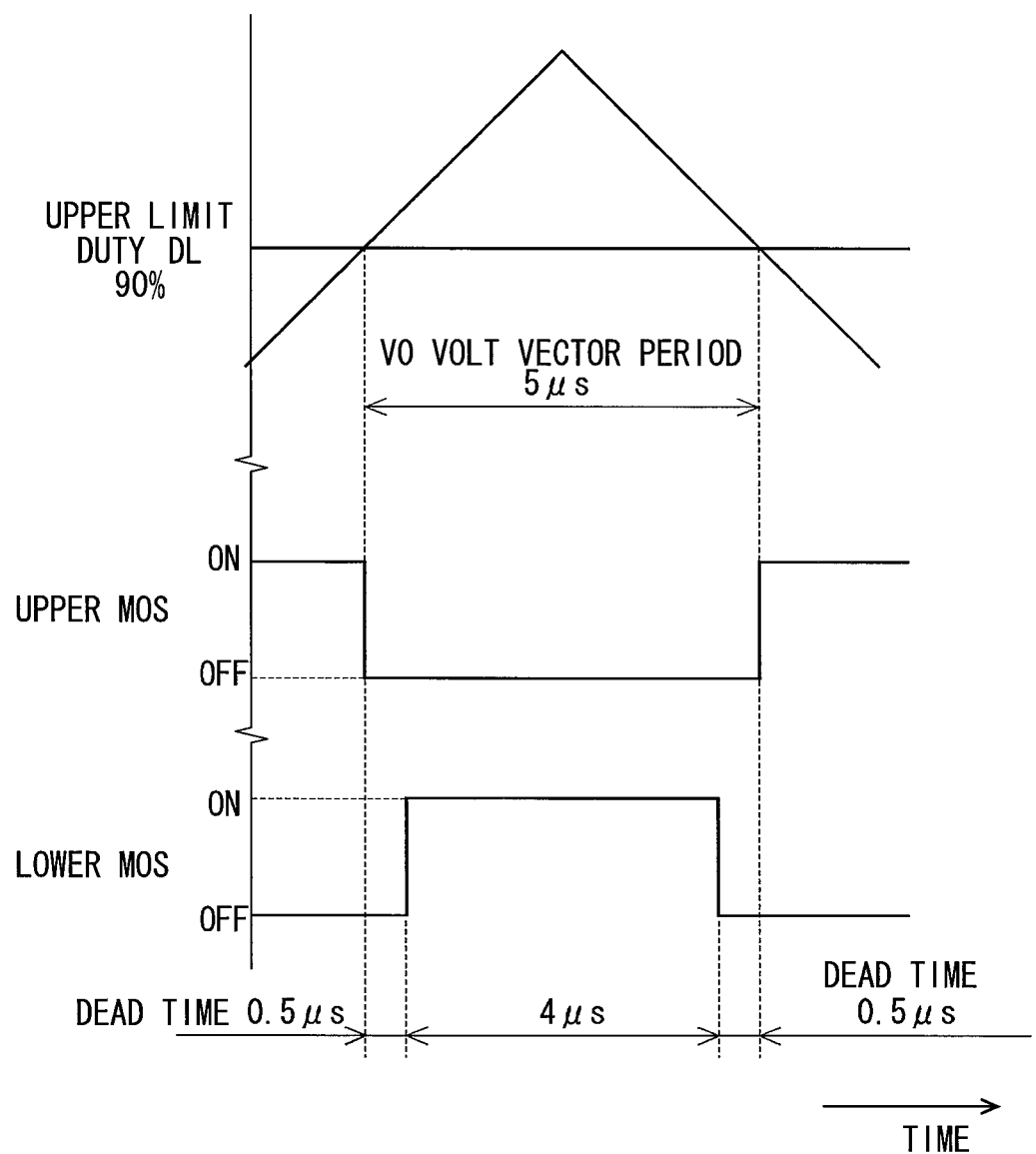
FIG. 11 is a diagram showing an upper duty limit, at which current is detectable by the Shunt resistor.

Further, as shown in FIG. 11, it is necessary for the time interval between the time, at which the upper MOSFET turns off, and the time, at which the lower MOSFET turns on, to include dead time equal to 0.5 microseconds. Further, it is necessary for the time interval between the time, at which the lower MOSFET turns off, and the time, at which the upper MOSFET turns on, to include dead time equal to 0.5 microseconds. Thus, it is necessary to make a total of dead time equal to 1 microsecond. Therefore, the time interval, in which the upper MOSFET maintains in the off-state, is at least five microseconds, which is the minimum detection time for detecting the current.

Figure 12:
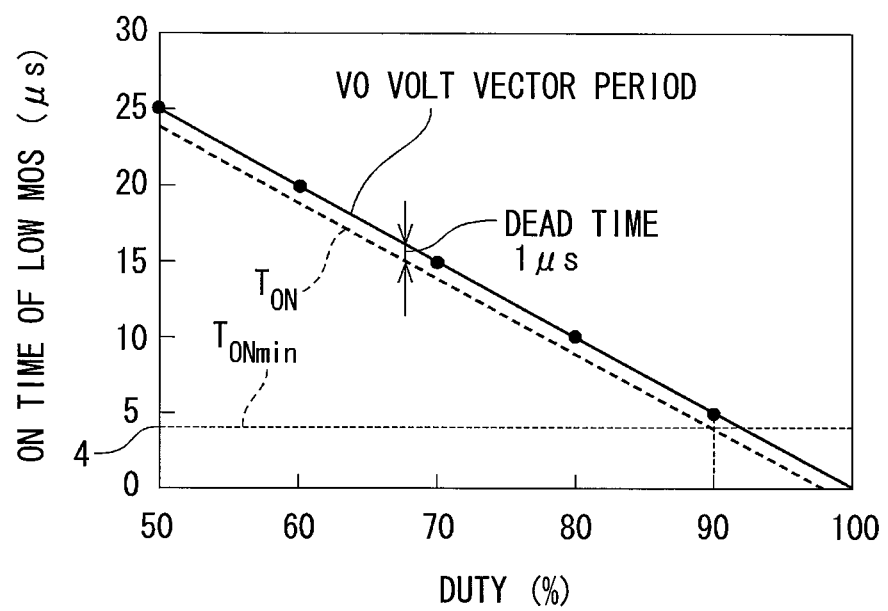
FIG. 12 is a graph showing a relationship between a duty value and a Vo voltage vector generation period in one phase, at which the current is detected.

In the present embodiment, since the period of the carrier wave is 50 microseconds, as shown in FIG. 12, the minimum detection time is sufficiently secured when the duty ratio is equal to or smaller than 90%. Thus, in the present embodiment, the upper duty limit is set to be 90%. Thus, when one of the update duty values at three phases exceeds the upper duty limit of 90%, the process for correcting the update duty value to be the pseudo duty value is executed.

The process executed by the pseudo duty calculation device 56 will be explained.

Figure 13:
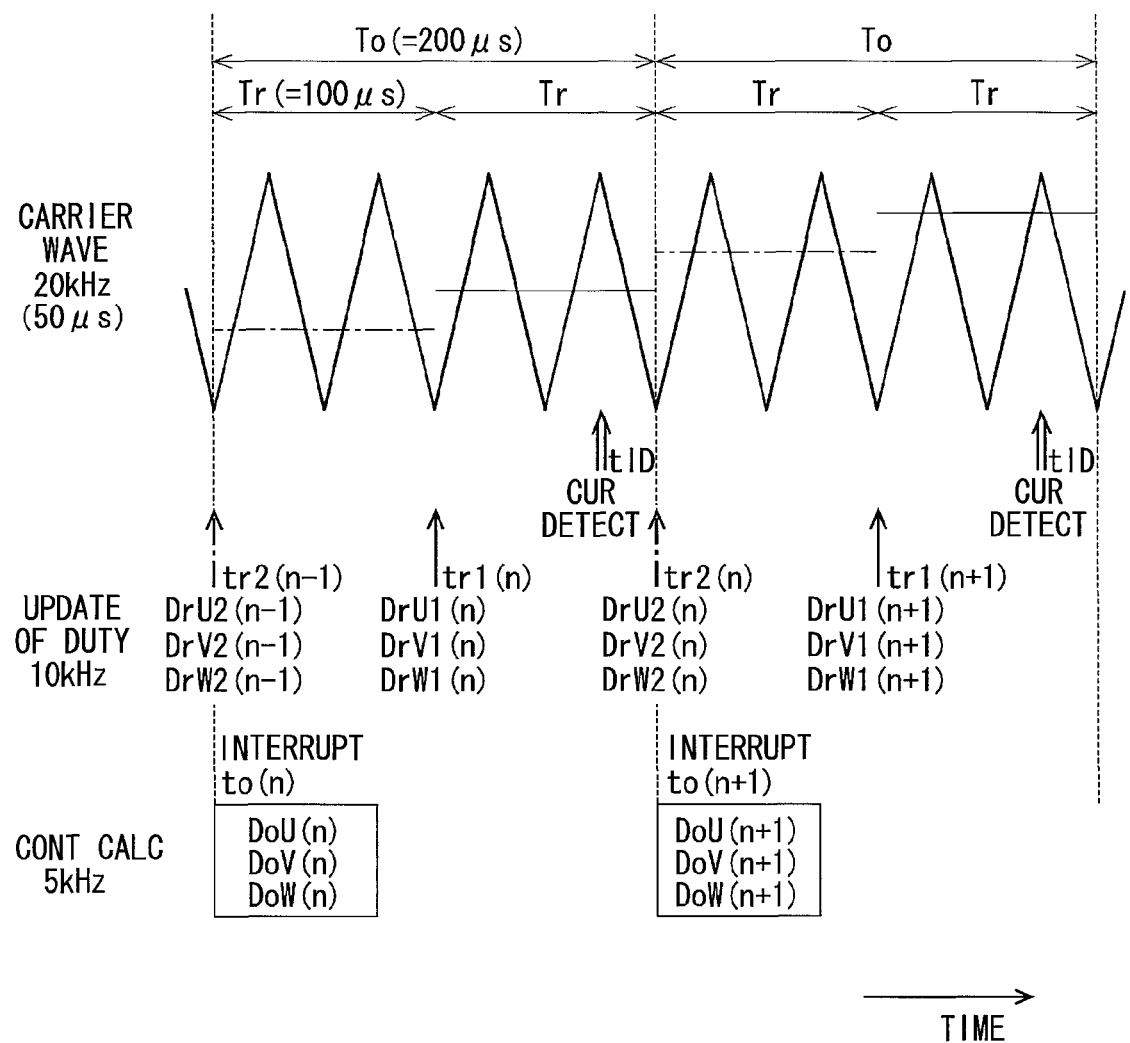
FIG. 13 is a timing chart showing a control process and an update of the duty value according to the first and second embodiments.

First, as shown in FIG. 13, common features between the first embodiment and the second to fifth embodiments will be explained.

In the first to fifth embodiments, the frequency of the control process by the control calculation device 50 is 5 kHz, and the period To of the calculation is 200 microseconds. Further, the current detection with using the Shunt resistors 41-43 is performed at a cycle, which is the same as the calculation period To. The current detection time tID coincides with a peak of the carrier wave.

The frequency of the carrier wave is 20 kHz, and the period of the carrier wave is 50 microseconds. Accordingly, four cycles of the carrier wave are disposed in one cycle of the calculation period To. In the first to fourth embodiments, the interruption of the control calculation process is performed at a bottom of the carrier wave. In the fifth embodiment, the interruption of the control calculation process is performed at a top of the carrier wave.

The duty command values of the U phase, the V phase and the W phase, which are calculated at the n-th control calculation process, are defined as DoU(n), DoV(n), and DoW(n). A group of the update duty values, which are prepared based on the n-th duty command value, are referred as DrU1(n), DrV1(n), DrW1(n) and so on. Here, when the number of control calculation process is not specified, i.e., when the number of the control calculation process is not specified in the duty command values and the update duty values, the indication of (n) is deleted, so that the duty command values are defined as DoU, DoV(n), and DoW(n), and the update duty values are referred as DrU1, DrV1, DrW1 and so on. When the phase is not specified, the duty command value is referred as Do, and the update duty value is referred as Dr.

The update duty value, which is corrected to be the pseudo duty value in the upper shift process and the lower shift process, is referred as DrU1'(n), DrV1'(n) and DrW1'(n).

Specific features in the first embodiment will be explained with reference to FIG. 13.

As shown in FIG. 13, the pseudo duty calculation device 56 generates the update duty value Dr twice in one cycle of the calculation period. Thus, the update frequency is 10 kHz, which is twice larger than the control calculation frequency, i.e., 5 kHz. The update period Tr, which is 100 microseconds, is a half of the calculation period To, which is 200 microseconds, as described in an equation of No. 1

$$Tr=(1/2)To \quad \text{(Equation No. 1)}$$

The update duty value corresponding to the duty command value Do(n), which is generated by the n-th control calculation, is calculated such that the first update duty value Dr1(n) is calculated at the first update time tr1(n) after the time interval of (1/2)To has elapsed from the control calculation time to(n), and the second update duty value Dr2(n) is calculated at the second update time tr2(n) after the update period Tr has elapsed from the first update time tr1(n). The first update duty value Dr1(n) is effective by the second update time tr2. The current detection time tID is arranged in the effective period of the first update duty value Dr1(n).

Figure 14:
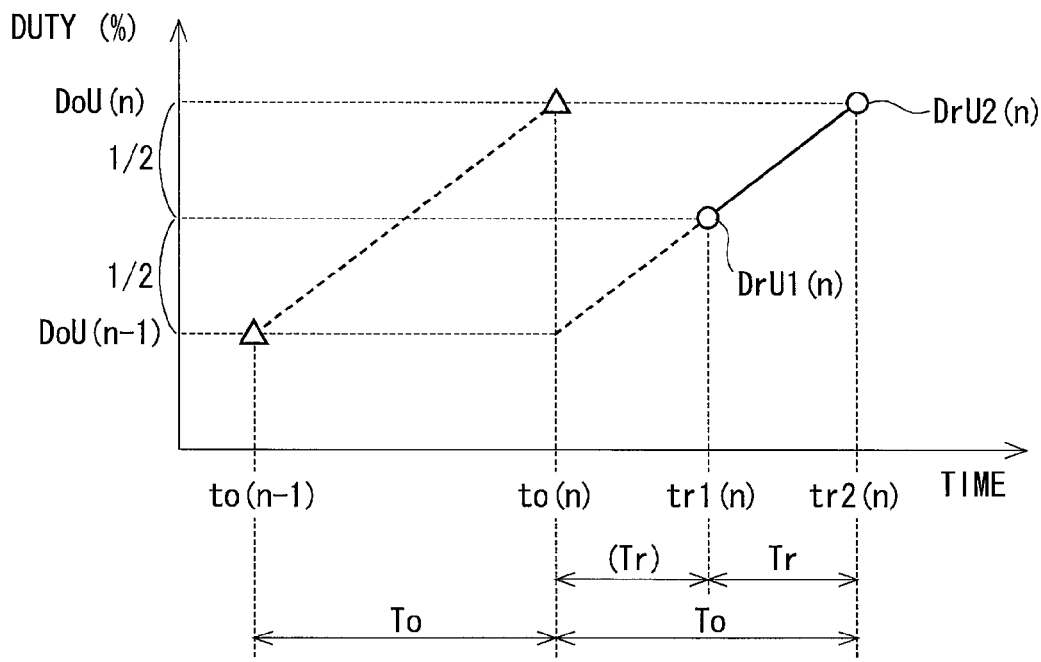
FIG. 14 is a graph showing a linear compensation process according to the first and second embodiments.

As shown in FIG. 14, for example, the first and second update duty values DrU1(n), DrU2(n) of the U phase are calculated by the linear compensation method in accordance with the ratio between the update period Tr and the calculation period To, based on the (n-1)-th duty command value DoU(n-1) and the n-th duty command value DoU(n). Thus, the following equations No. 2 and No. 3 are obtained.

$$DrU1(n)=DoU(n-1)+\{DoU(n)-DoU(n-1)\}/2 \quad \text{(Equation No. 2)}$$

$$DrU2(n)=DoU(n) \quad \text{(Equation No. 3)}$$

Figure 15:
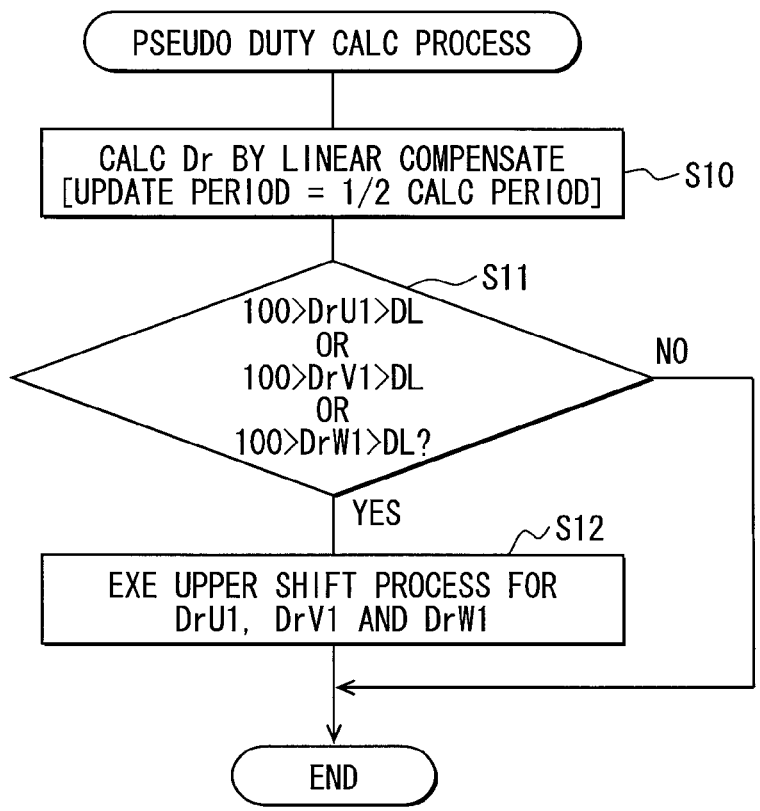
FIG. 15 is a flowchart showing a pseudo duty calculation process according to the first embodiment.

As shown in FIG. 15, in the pseudo duty calculation process according to the first embodiment, the update duty value Dr1, Dr2 of each phase is calculated by the linear compensation method at step S10. Then, at step S11, the first update duty value Dr1 is checked. Here, the first update duty value Dr1 is effective at the current detection time tID.

At step S11, it is determined whether the first update duty value DrU1, DrV1, DrW1 of each phase exceeds the upper duty limit DL and is disposed in a prohibition range, which is smaller than 100. When one of the first update duty values DrU1, DrV1, DrW1 is disposed in the prohibition range, i.e., when the determination in step S11 is "YES," it goes to step S12, and at step S12, the upper shift process is executed.

When all of the first update duty values DrU1, DrV1, DrW1 are not disposed in the prohibition range, i.e., when the determination in step S11 is "NO," the pseudo duty calculation process is terminated. In this case, the first update duty values DrU1, DrV1, DrW1 are output without correcting.

The upper shift process will be explained assuming that the first update duty value DrU1 of the U phase is the largest among the first update duty values DrU1, DrV1, DrW1, and the first update duty value DrU1 is disposed in the prohibition range.

Figure 16:
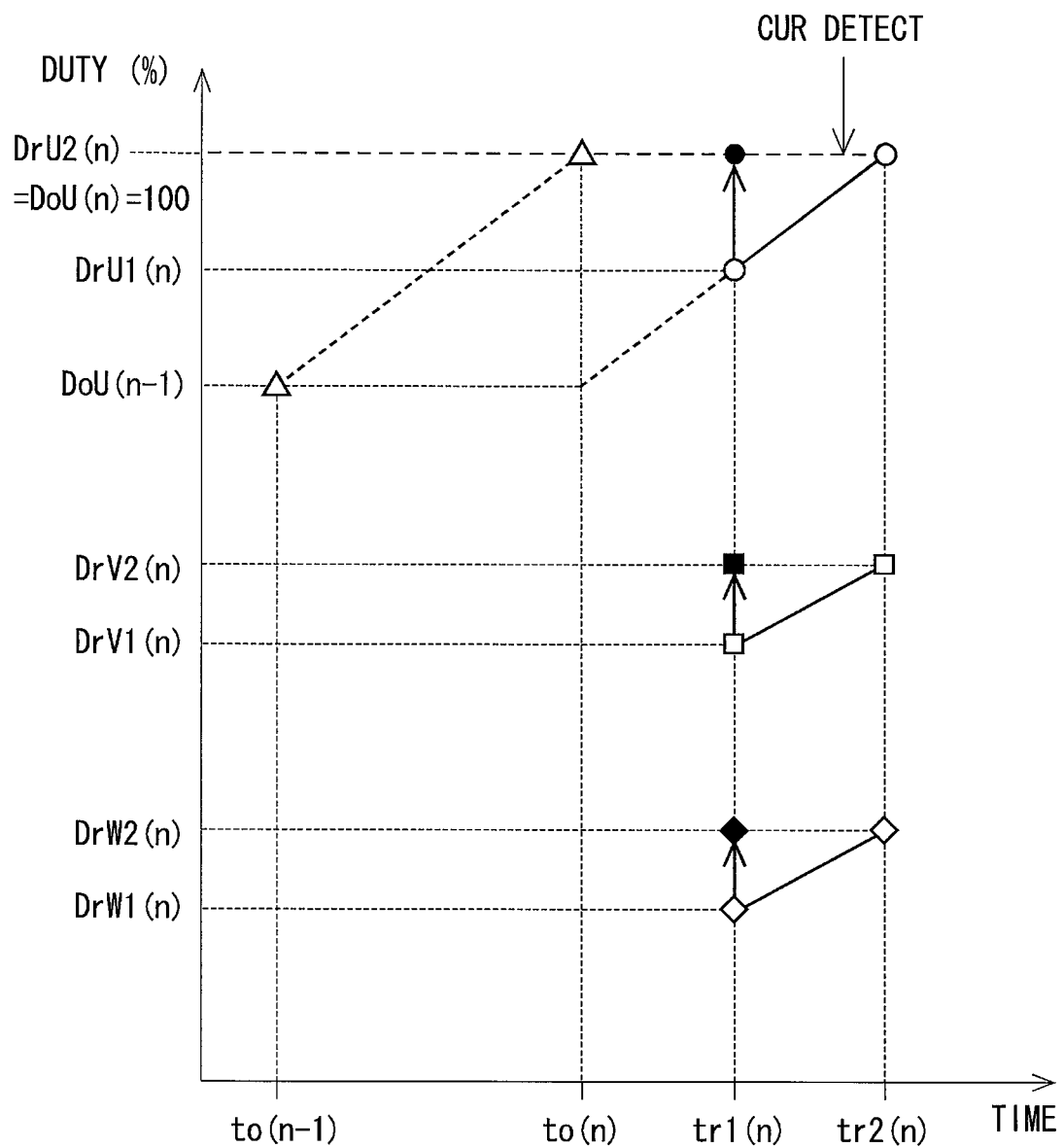
FIG. 16 is a graph showing an upper shift process according to the first embodiment.

As shown in FIG. 16, in the upper shift process, the first update duty value DrU1 of the U phase is corrected to be equal to the second update duty value DrU2, so that the first update duty value DrU1 as the pseudo duty value is output. Here, in the average voltage changing process of the duty command device 55, when the on-state time interval of the low MOSFETS at the V phase and the W phase corresponding to the voltage vector V1 is longer than the on-state time of the low MOSFETS at all phases corresponding to the voltage vector V0, the duty command value DoU(n) is shifted to the upper side, and the shifted duty command value DoU(n) is output. Accordingly, since the second update duty value DrU2 is 100%, the first update duty value DrU1 becomes 100%.

Further, each of the first update duty values DrV1, DrW1 at the V phase and the W phase are corrected to be equal to the second update duty values DrV2, DrW2 so that the first update duty values DrV1, DrW1 as the pseudo duty value is output. Thus, the following equations No. 4 to No. 6 are obtained.

$$DrU1'(n)=DrU2(n)=100 \quad \text{(Equation No. 4)}$$

$$DrV1'(n)=DrV2(n) \quad \text{(Equation No. 5)}$$

$$DrW1'(n)=DrW2(n) \quad \text{(Equation No. 6)}$$

Thus, the V1 voltage vector period, in which the lower MOSFETS of the V phase and the W phase turn on, is secured, and then, the current is detected. Further, the current flowing through the U phase is estimated by Kirchhoff law.

In the first embodiment, since the update duty value Dr is calculated according to the update period Tr, which is a half of the calculation period To, repetition (i.e., the number of times) for comparing the duty ratio and the carrier wave increases without increasing the number of the interruption processes of the duty command value To. Further, the update duty value Dr is calculated by the linear compensation method, which has a low calculation load. Accordingly, the motor 80 is stably controlled with reducing the calculation load. Therefore, the noise, the vibration and the torque ripple are reduced.

Further, the average voltage changing process for securing the current detection time sufficiently is primarily executed with respect to the duty command value Do, the average voltage changing process is secondly executed with respect to the first update duty value Dr1 at the current detection time tID. Thus, the current detection time for the Shunt resistors 41-43 is appropriately secured. Thus, the current to be supplied to the motor 80 from the inverter 201 is surely detected.

Second Embodiment

A second embodiment will be explained with reference to FIGS. 13-14 and 17-18. The update timing of the update duty value Dr and the calculation method of the update duty value Dr shown in FIGS. 13 and 14 are similar to the first embodiment.

Figure 17:
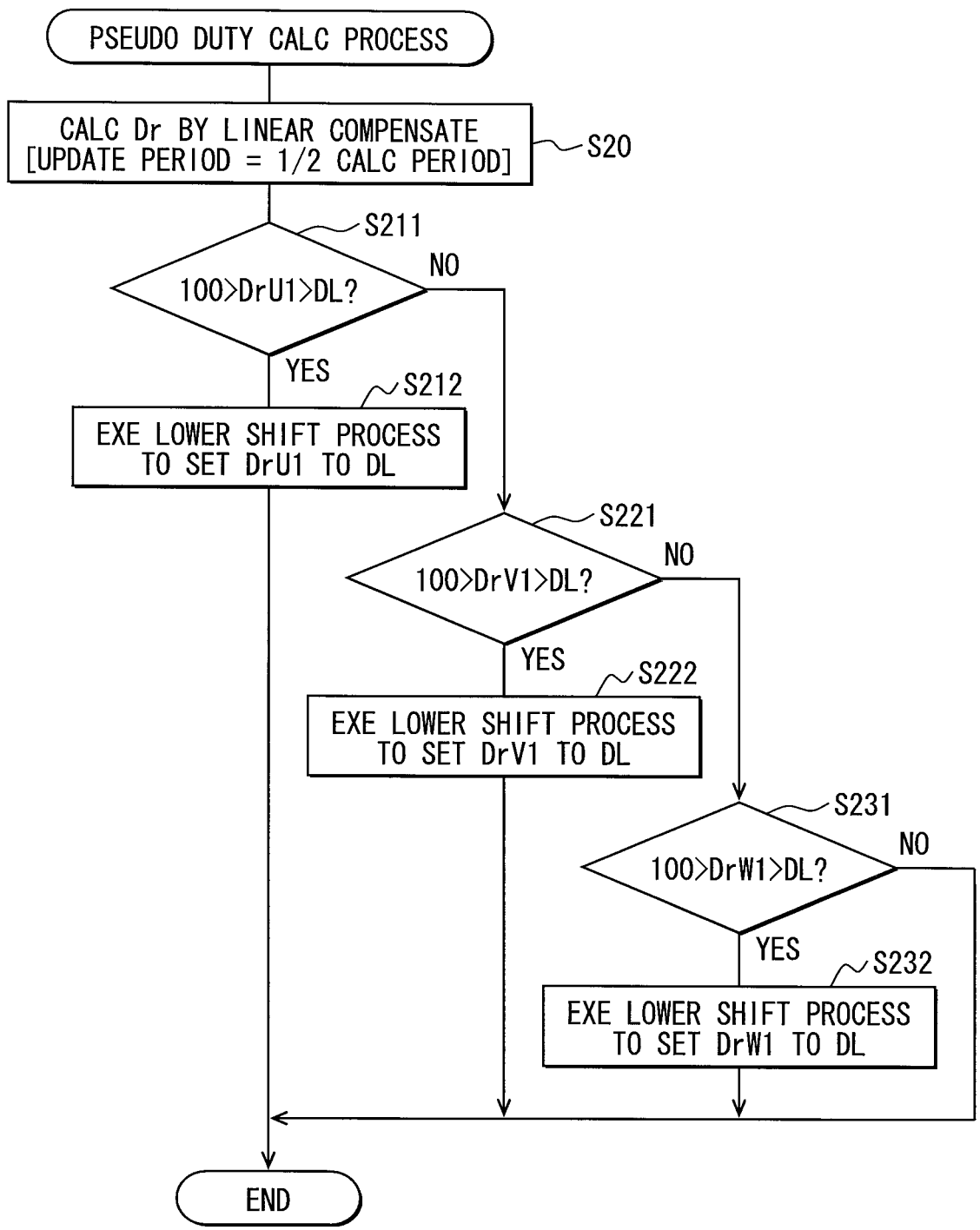
FIG. 17 is a flowchart showing a pseudo duty calculation process according to the second embodiment.

As shown in FIG. 17, in the pseudo duty calculation process according to the second embodiment, the update duty value Dr1, Dr2 of each phase is calculated by the linear compensation method at step S20. Then, at steps S211 to S231, the first update duty value of each phase is checked in turn. Here, the first update duty value Dr1 is effective at the current detection time tID.

At step S211, it is determined whether the first update duty value DrU1 of the U phase exceeds the upper duty limit DL and is disposed in a prohibition range, which is smaller than 100. When the first update duty value DrU1 is disposed in the prohibition range, i.e., when the determination in step S211 is "YES," it goes to step S212, and at step S212, the lower shift process is executed.

When the first update duty value DrU1 is not disposed in the prohibition range, i.e., when the determination in step S211 is "NO," it goes to step S221. At step S221, it is determined whether the first update duty value DrV1 of the V phase exceeds the upper duty limit DL and is disposed in a prohibition range, which is smaller than 100. When the first update duty value DrV1 is disposed in the prohibition range, i.e., when the determination in step S221 is "YES," it goes to step S222, and at step S222, the lower shift process is executed.

When the first update duty value DrV1 is not disposed in the prohibition range, i.e., when the determination in step S221 is "NO," it goes to step S231. At step S231, it is determined whether the first update duty value DrW1 of the W phase exceeds the upper duty limit DL and is disposed in a prohibition range, which is smaller than 100. When the first update duty value DrW1 is disposed in the prohibition range, i.e., when the determination in step S231 is "YES," it goes to step S232, and at step S232, the lower shift process is executed.

When the first update duty value DrW1 is not disposed in the prohibition range, i.e., when the determination in step S231 is "NO," the pseudo duty calculation process ends. In this case, the first update duty values DrU1, DrV1, DrW1 are output without correcting.

The lower shift process will be explained assuming that the first update duty value DrU1 of the U phase is the largest among the first update duty values DrU1, DrV1, DrW1, and the first update duty value DrU1 is disposed in the prohibition range.

Figure 18:
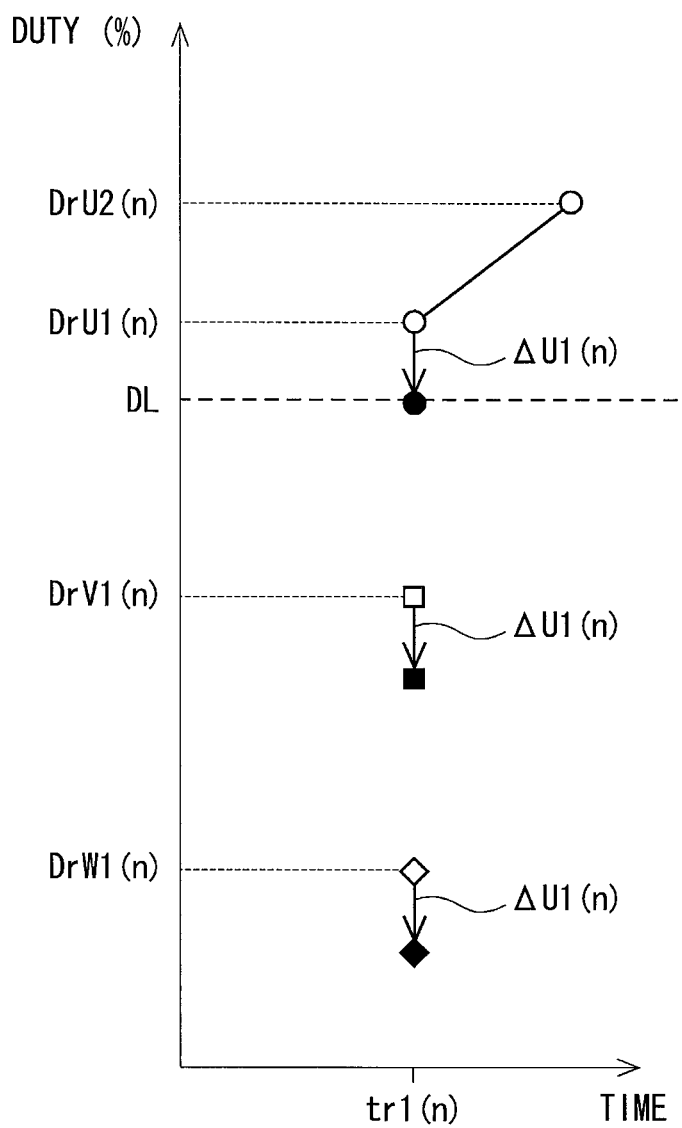
FIG. 18 is a graph showing a lower shift process according to the second embodiment.

As shown in FIG. 18, in the lower shift process, the first update duty value DrU1 of the U phase is corrected to be equal to the upper duty limit DL, so that the first update duty value DrU1 as the pseudo duty value is output. In this case, the lower shift amount of the first update duty value DrU1 is defined as a first lower shift amount $\Delta U1$. The first lower shift amount $\Delta U1$ is negative. Thus, the equations No. 7 and No. 8 are obtained.

$DrU1'(n)=DL$ (Equation No. 7)

$\Delta U1=DL-DrU1<0$ (Equation No. 8)

Further, regarding the V phase and the W phase, as described equations No. 9 and No. 10, the first lower shift amount $\Delta U1$ is added to the first update duty value DrV1, DrW1 so that the lower shift step is executed.

$DrV1'(n)=DrV1+\Delta U1$ (Equation No. 9)

$DrW1'(n)=DrW1+\Delta U1$ (Equation No. 10)

Thus, the on-state time of the lower MOSFET of the U phase, which has the largest first update duty value DrU1 at the first update time tr1, is set to be the minimum detection time. Then, the current is detected in the V0 voltage vector period, in which the lower MOSFETS of three phases turn on.

The second embodiment provides similar effects to the first embodiment.

Third Embodiment

Next, a third embodiment will be explained with reference to FIGS. 19 to 22.

Figure 19:
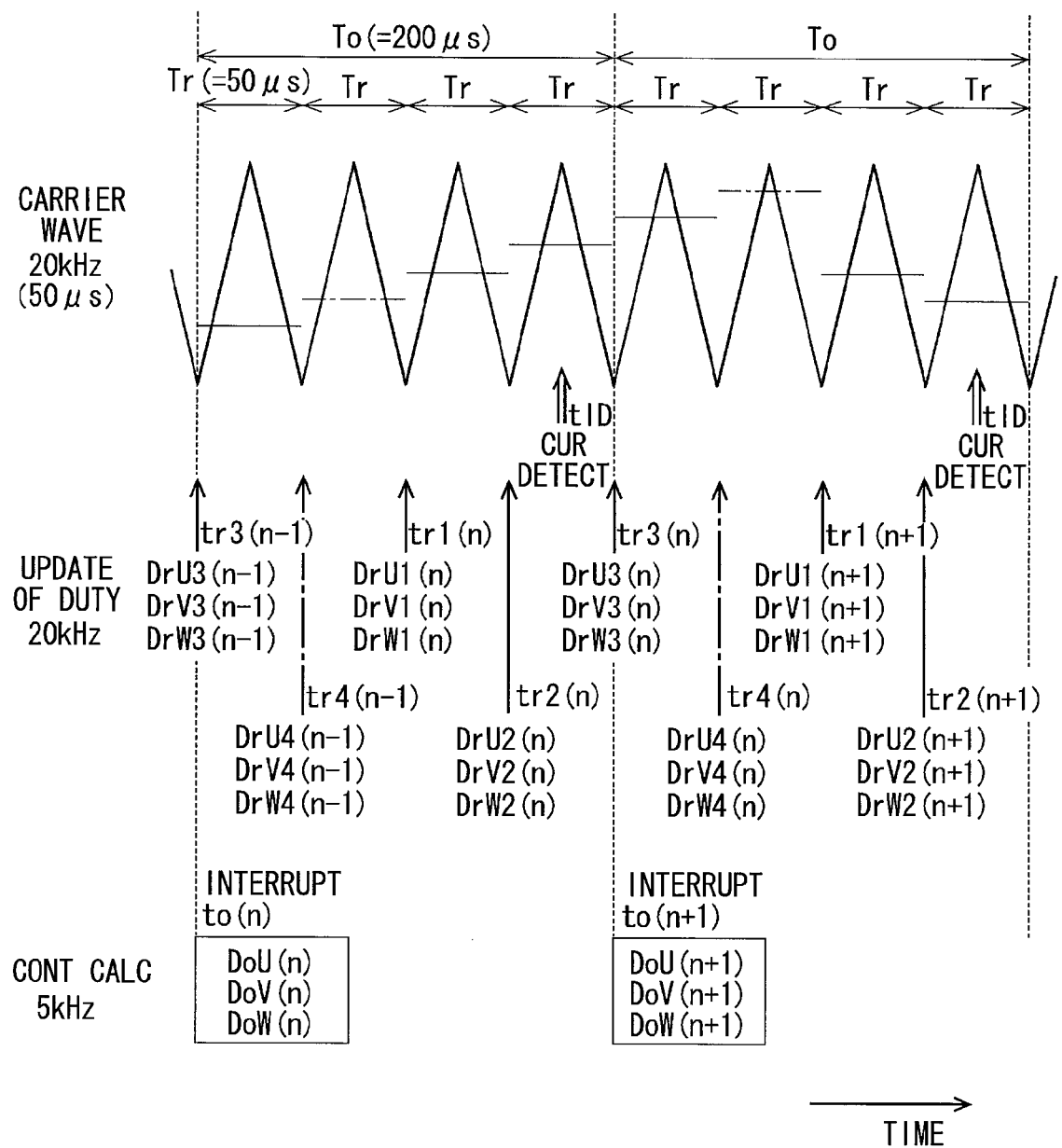
FIG. 19 is a timing chart showing a control process and an update of the duty value according to the third and fourth embodiments.

As show in FIG. 19, the pseudo duty calculation device 56 generates the update duty value Dr four times in one cycle of the calculation period To. The update frequency is 20 kHz, which is four times larger than the control calculation frequency, i.e., 5 kHz. The update period Tr, which is 50 microseconds, is a one-fourth of the calculation period To which is 200 microseconds, as described in an equation of No. 11.

$Tr=(\frac{1}{4})To$ (Equation No. 11)

The update duty value corresponding to the duty command value Do(n), which is generated by the n-th control calculation, is calculated such that the first update duty value Dr1(n) is calculated at the first update time tr1(n) after the time interval of ($\frac{1}{2}$)To has elapsed from the control calculation time to(n). Then, the second update duty value Dr2(n) is calculated at the second update time tr2(n) after the update period Tr has elapsed from the first update time tr1(n). Then, the third update duty value Dr3(n) is calculated at the third update time tr3(n) after the update period Tr has elapsed from the second update time tr2(n). Then, the fourth update duty value Dr4(n) is calculated at the fourth update time tr4(n) after the update period Tr has elapsed from the third update time tr3(n).

The current detection time tID coincides with the peak of the carrier wave between the second update time tr2 and the third updated time tr3. Accordingly, the second update duty value Dr2(n) is effective at the current detection time tID.

Figure 20:
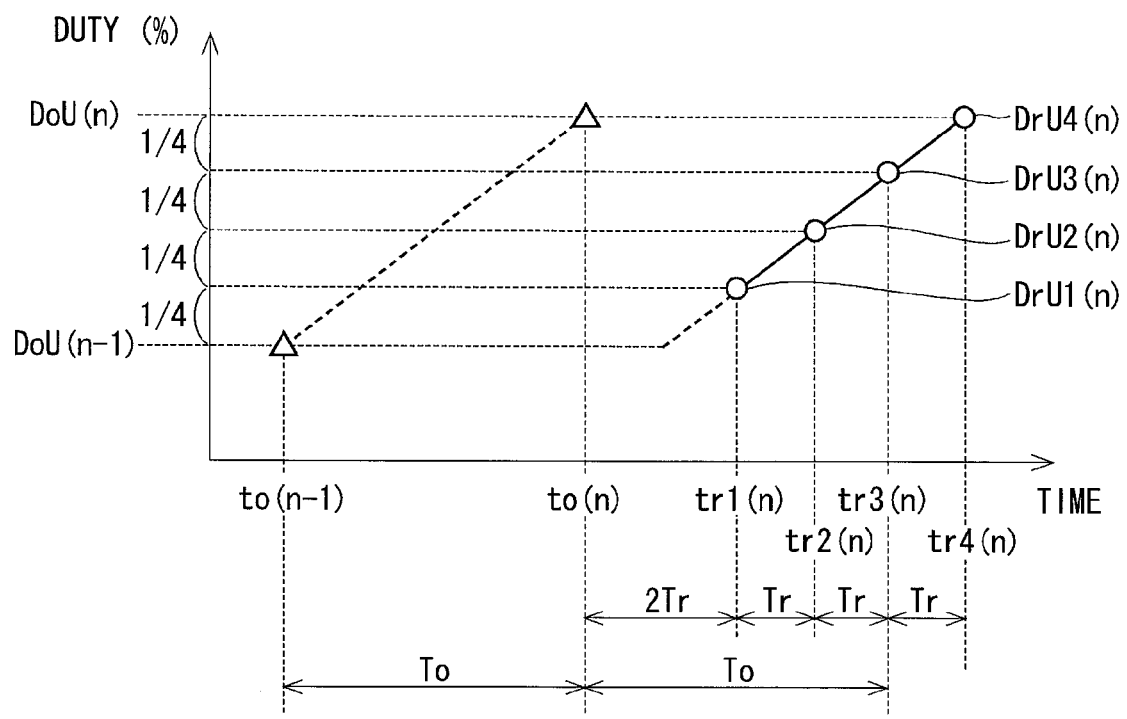
FIG. 20 is a graph showing a linear compensation process according to the third and fourth embodiments.

As shown in FIG. 20, for example, the first to fourth update duty values DrU1(n), DrU2(n), DrU3(n), DrU4(n) of the U phase are calculated by the linear compensation method in accordance with the ratio between the update period Tr and the calculation period To, based on the (n−1)-th duty command value DoU(n−1) and the n-th duty command value DoU(n). Thus, the following equations No. 12 to No. 15 are obtained.

$DrU1(n)=DoU(n-1)+\{DoU(n)-DoU(n-1)\}/4$ (Equation No. 12)

$DrU2(n)=DoU1(n)+\{DoU(n)-DoU(n-1)\}/4$ (Equation No. 13)

$DrU3(n)=DoU2(n)+\{DoU(n)-DoU(n-1)\}/4$ (Equation No. 14)

$DrU4(n)=DoU(n)$ (Equation No. 15)

Figure 21:
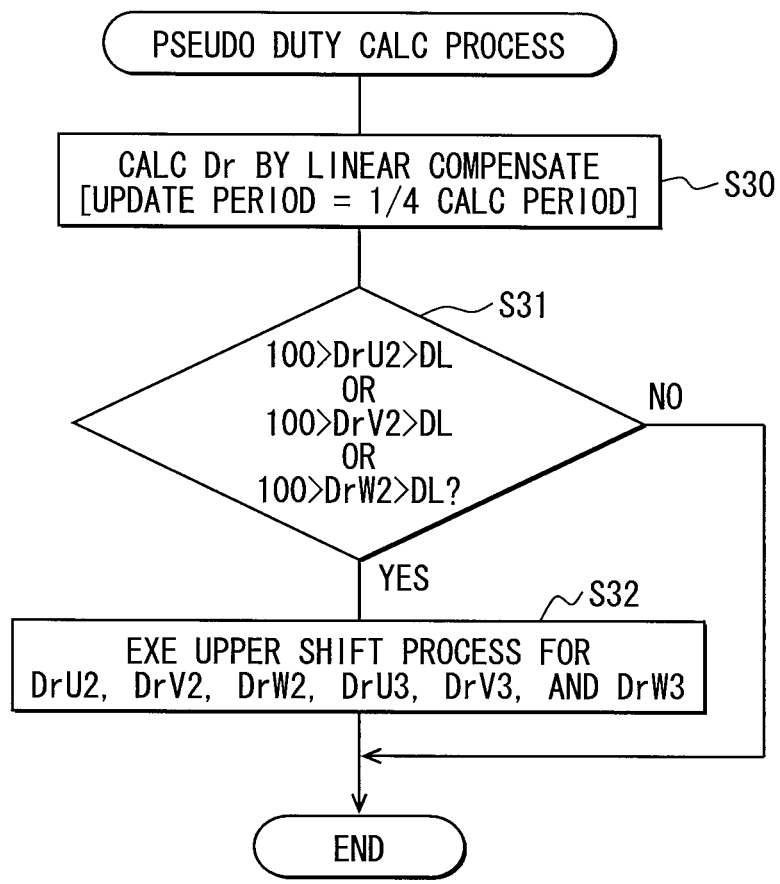
FIG. 21 is a flowchart showing a pseudo duty calculation process according to the third embodiment.

As shown in FIG. 21, in the pseudo duty calculation process according to the third embodiment, the update duty value Dr1, Dr2, Dr3, Dr4 of each phase is calculated by the linear compensation method at step S30. Then, at step S31, the second update duty value Dr2 is checked. Here, the second update duty value Dr2 is effective at the current detection time tID.

At step S31, it is determined whether the second update duty value DrU2, DrV2, DrW2 of each phase exceeds the upper duty limit DL and is disposed in a prohibition range, which is smaller than 100. When one of the second update duty values DrU2, DrV2, DrW2 is disposed in the prohibition range, i.e., when the determination in step S31 is "YES," it goes to step S32, and at step S32, the upper shift process is executed.

When all of the second update duty values DrU2, DrV2, DrW2 are not disposed in the prohibition range, i.e., when the determination in step S31 is "NO," the pseudo duty calculation process is terminated. In this case, the second update duty values DrU2, DrV2, DrW2 are output without correcting.

The upper shift process will be explained assuming that the second update duty value DrU2 of the U phase is the largest among the second update duty values DrU2, DrV2, DrW2, and the second update duty value DrU2 is disposed in the prohibition range.

Figure 22:
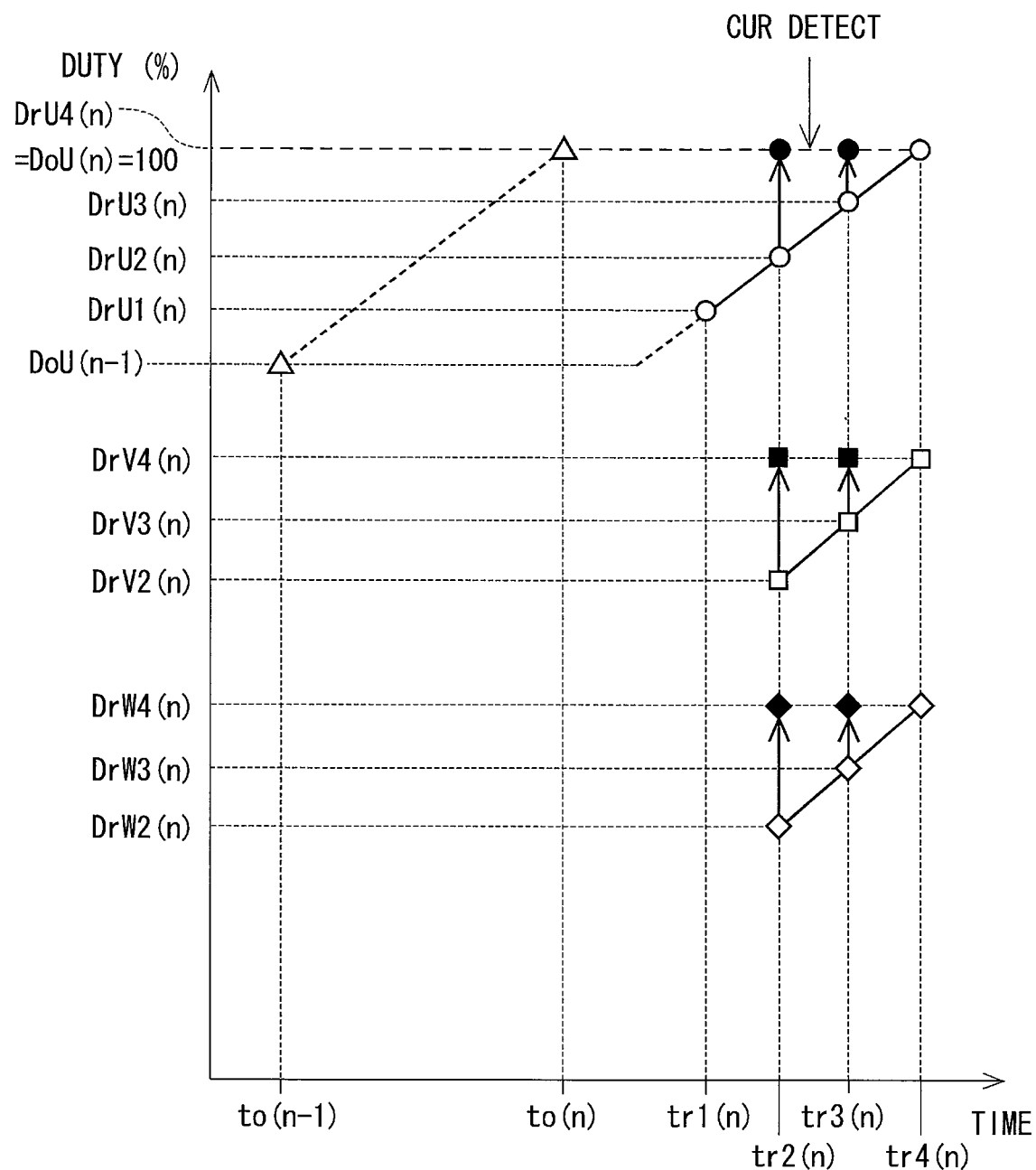
FIG. 22 is a graph showing an upper shift process according to the third embodiment.

As shown in FIG. 22, in the upper shift process, the second update duty value DrU2 of the U phase and the third update duty value DrU3 just after the current detection time tID are corrected to be equal to the fourth update duty value DrU4, so that the second update duty value DrU2 and the third update duty value DrU3 as the pseudo duty value are output. Here, in the average voltage changing process of the duty command device 55, when the on-state time interval of the low MOSFETS at the V phase and the W phase corresponding to the voltage vector V1 is longer than the on-state time of the low MOSFETS at all phases corresponding to the voltage vector V0, the duty command value DoU(n) is shifted to the upper side to be 100%, and the shifted duty command value DoU(n) is output. Accordingly, since the fourth update duty value DrU4 is 100%, the second and third update duty values DrU2, DrU3 becomes 100%.

Further, each of the second update duty values DrV2, DrW2 and the third update duty values DrV3, DrW3 at the V phase and the W phase is corrected to be equal to the fourth update duty values DrV4, DrW, respectively, so that the second and third update duty values DrV2, DrW2, DrV3, DrW3 as the pseudo duty value are output.

Thus, the V1 voltage vector period, in which the lower MOSFETS of the V phase and the W phase turn on, is secured, and then, the current is detected. Further, the current flowing through the U phase is estimated by Kirchhoff law.

In the third embodiment, the frequency of the update period Tr is twice larger than the first embodiment. Thus, the motor 80 is stably controlled. Therefore, the noise, the vibration and the torque ripple are reduced.

Fourth Embodiment

A fourth embodiment will be explained with reference to FIGS. 13-14 and 19-20 and 23-24. The update timing of the update duty value Dr and the calculation method of the update duty value Dr shown in FIGS. 19 and 20 are similar to the third embodiment.

Figure 23:
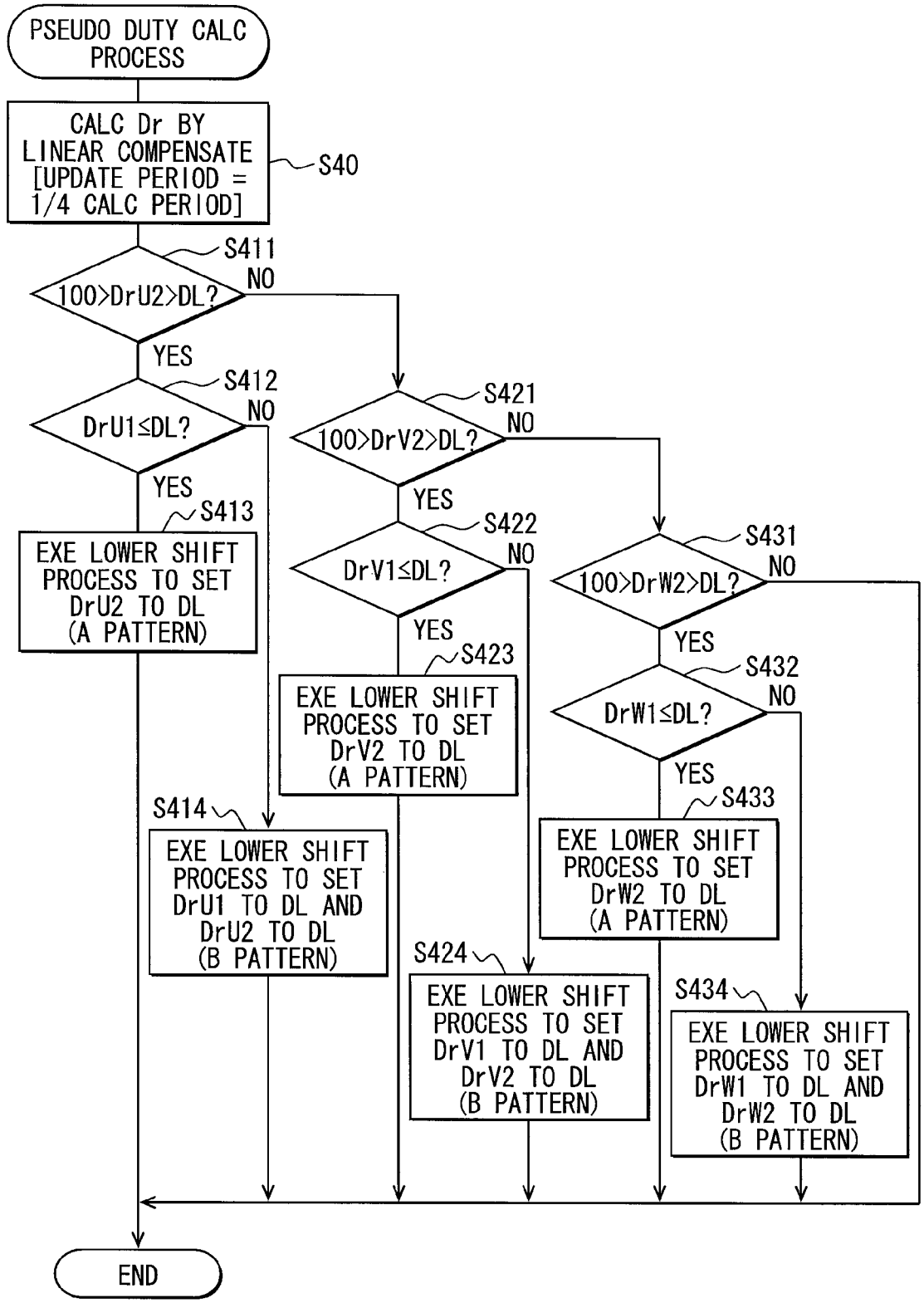
FIG. 23 is a flowchart showing a pseudo duty calculation process according to the fourth embodiment.

As shown in FIG. 23, in the pseudo duty calculation process according to the fourth embodiment, the update duty values Dr1, Dr2, Dr3, Dr4 of each phase is calculated by the linear compensation method at step S40. Then, at steps S411 to S432, the first update duty value and the second update duty value of each phase are checked in turn. Here, the second update duty value Dr2 is effective at the current detection time tID.

At step S411, it is determined whether the second update duty value DrU2 of the U phase exceeds the upper duty limit DL and is disposed in a prohibition range, which is smaller than 100. When the second update duty value DrU2 is disposed in the prohibition range, i.e., when the determination in step S411 is "YES," it goes to step S412, and at step S412, it is determined whether the first update duty value DrU1 of the U phase is equal to or smaller than the upper duty limit DL.

When the second update duty value DrU2 is disposed in the prohibition range, i.e., the determination in step S411 is "YES," and the first update duty value DrU1 of the U phase is equal to or smaller than the upper duty limit DL, i.e., the determination in step S412 is "YES," it goes to step S413, and at step S413, the A pattern of the lower shift process is executed. When the second update duty value DrU2 is disposed in the prohibition range, i.e., the determination in step S411 is "YES," and the first update duty value DrU1 of the U phase exceeds the upper duty limit DL and is disposed in the prohibition range, i.e., the determination in step S412 is "NO," it goes to step S414, and at step S414, the B pattern of the lower shift process is executed.

When the second update duty value DrU2 is not disposed in the prohibition range, i.e., when the determination in step S411 is "NO," the second update duty value DrV2 of the V phase and the first update duty value DrV1 of the V phase are similarly checked at step S421 and step S422. When the second update duty value DrV2 is disposed in the prohibition range, i.e., when the determination in step S421 is "YES," one of the A pattern of the lower shift process and the B pattern of the lower shift process is executed at step S423 or step S424.

When the second update duty value DrV2 of the V phase is not disposed in the prohibition range, i.e., when the determination in step S421 is "NO," the second update duty value DrW2 of the W phase and the first update duty value DrW1 of the W phase are similarly checked at step S431 and step S432. When the second update duty value DrW2 is disposed in the prohibition range, i.e., when the determination in step S431 is "YES," one of the A pattern of the lower shift process and the B pattern of the lower shift process is executed at step S433 or step S434.

When the second update duty value DrW2 of the W phase is not disposed in the prohibition range, i.e., when the determination in step S431 is "NO;" the pseudo duty calculation process ends. In this case, the second update duty values DrU2, DrV2, DrW2 are output without correcting.

The A pattern lower shift process will be explained assuming that the second update duty value DrU2 of the U phase is the largest among the second update duty values DrU2, DrV2, DrW2, and the second update duty value DrU2 is disposed in the prohibition range.

Figure 24:
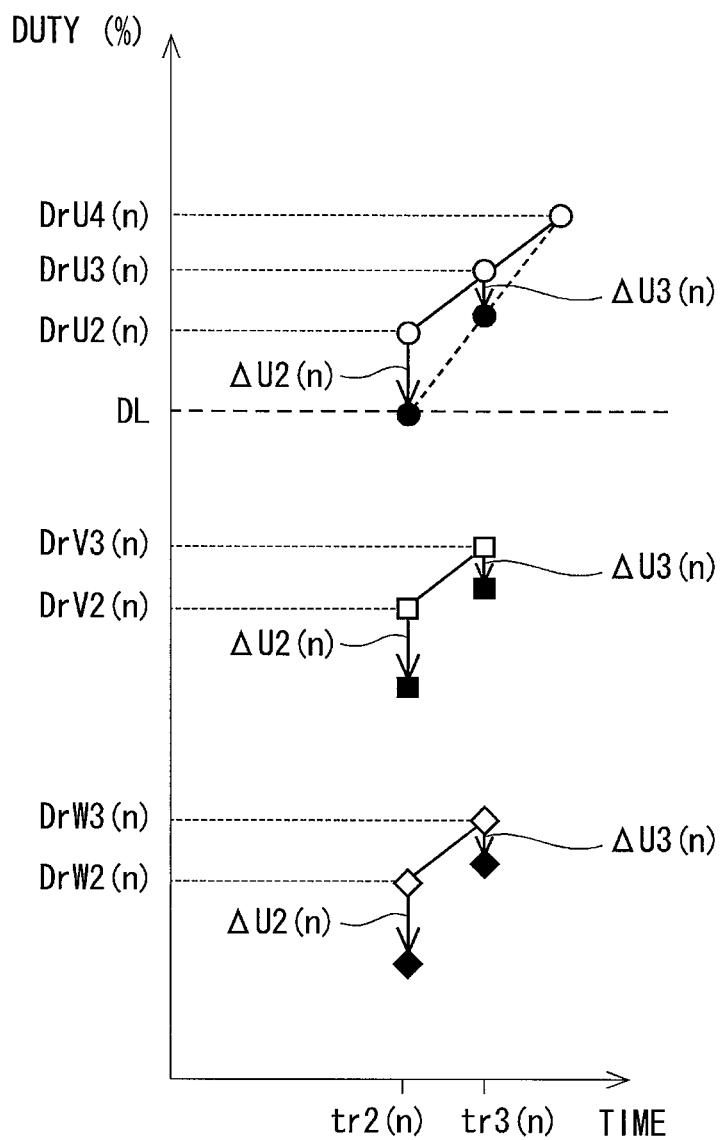
FIG. 24 is a graph showing an A pattern of a lower shift process according to the fourth embodiment.

As shown in FIG. 24, in the A pattern lower shift process, the second update duty value DrU2 of the U phase is corrected to be equal to the upper duty limit DL, so that the second update duty value DrU2 as the pseudo duty value is output. Further, the third update duty value DrU3 is re-calculated by the linear compensation method based on the upper duty limit DL and the fourth update duty value DrU4. In this case, the lower shift amount of the second update duty value DrU2 is defined as a second lower shift amount $\Delta U2$, and the lower shift amount of the third update duty value DrU3 is defined as a third lower shift amount $\Delta U3$.

Further, regarding the V phase and the W phase, the second update duty values DrV2, DrW2 are shifted to the lower side by the second lower shift amount $\Delta U2$, respectively. Furthermore, the third update duty values DrV3, DrW3 are shifted to the lower side by the third lower shift amount $\Delta U3$, respectively.

Thus, the on-state time of the lower MOSFET of the U phase, which has the largest second update duty value DrU2 at the second update time tr2, is set to be the minimum detection time. Then, the current is detected in the V0 voltage vector period, in which the lower MOSFETS of three phases turn on.

Then, the B pattern lower shift process will be explained assuming that the second update duty value DrU2 of the U phase is the largest among the second update duty values DrU2, DrV2, DrW2, and the first and second update duty values DrU1, DrU2 are disposed in the prohibition range.

Figure 25:
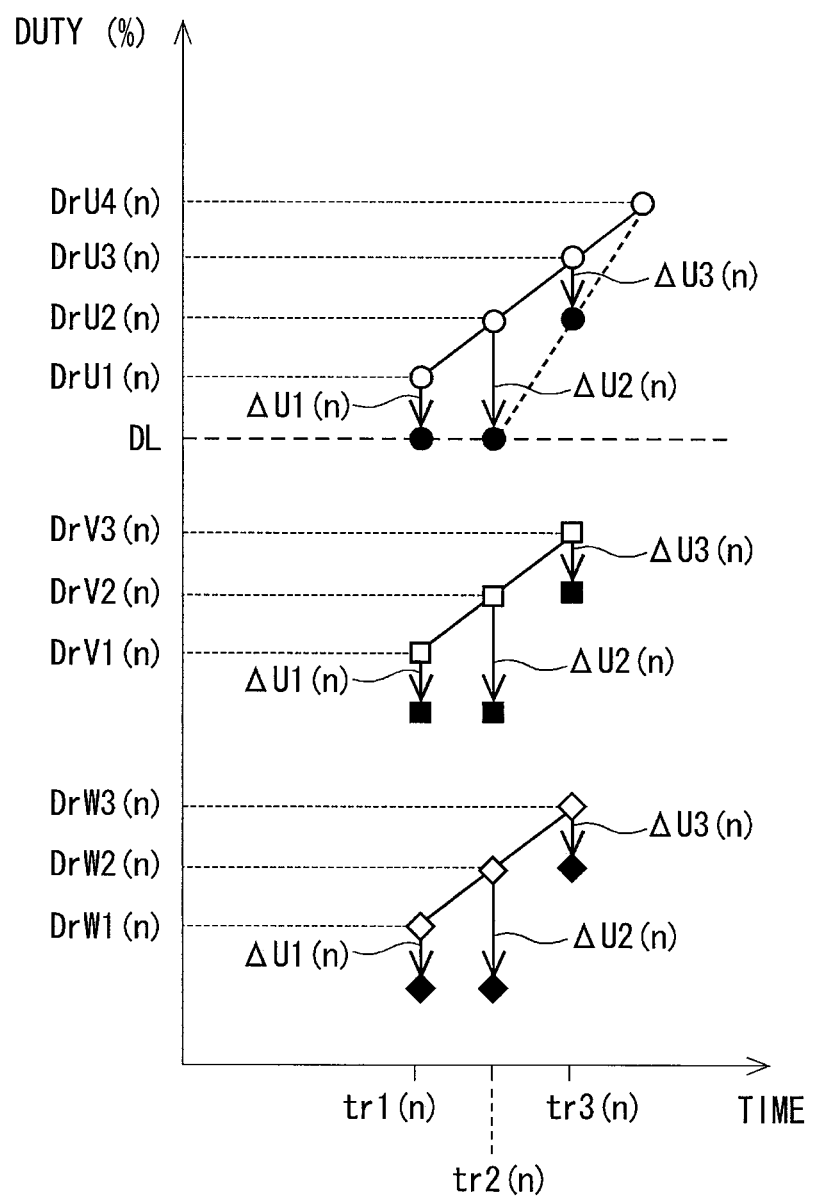
FIG. 25 is a graph showing a B pattern of a lower shift process according to the fourth embodiment.

As shown in FIG. 25, in the B pattern lower shift process, the first and second update duty values DrU1, DrU2 of the U phase are corrected to be equal to the upper duty limit DL, so that the first and second update duty values DrU1, DrU2 as the pseudo duty value are output. Further, the third update duty value DrU3 is re-calculated by the linear compensation method based on the upper duty limit DL and the fourth update duty value DrU4. In this case, the lower shift amount of the first update duty value DrU1 is defined as a first lower shift amount ΔU1, the lower shift amount of the second update duty value DrU2 is defined as a second lower shift amount ΔU2, and the lower shift amount of the third update duty value DrU3 is defined as a third lower shift amount ΔU3.

Further, regarding the V phase and the W phase, the first update duty values DrV1, DrW1 are shifted to the lower side by the first lower shift amount ΔU1, respectively. Further, the second update duty values DrV2, DrW2 are shifted to the lower side by the second lower shift amount ΔU2, respectively. Furthermore, the third update duty values DrV3, DrW3 are shifted to the lower side by the third lower shift amount ΔU3, respectively.

Thus, the on-state time of the lower MOSFET of the U phase, which has the largest second update duty value DrU2 at the second update time tr2, is set to be the minimum detection time. Then, the current is detected in the V0 voltage vector period, in which the lower MOSFETS of three phases turn on.

The fourth embodiment provides similar effects to the third embodiment.

Further, the third update duty value Dr3 is re-calculated by the linear compensation method according to the second update duty value Dr2 and the fourth update duty value Dr4. Thus, the update duty value Dr can be changed with a predetermined gradient between the second update time tr2 and the fourth update time tr4.

Fifth Embodiment

Next, a fifth embodiment will be explained with reference to FIGS. 26 to 27.

Figure 26:
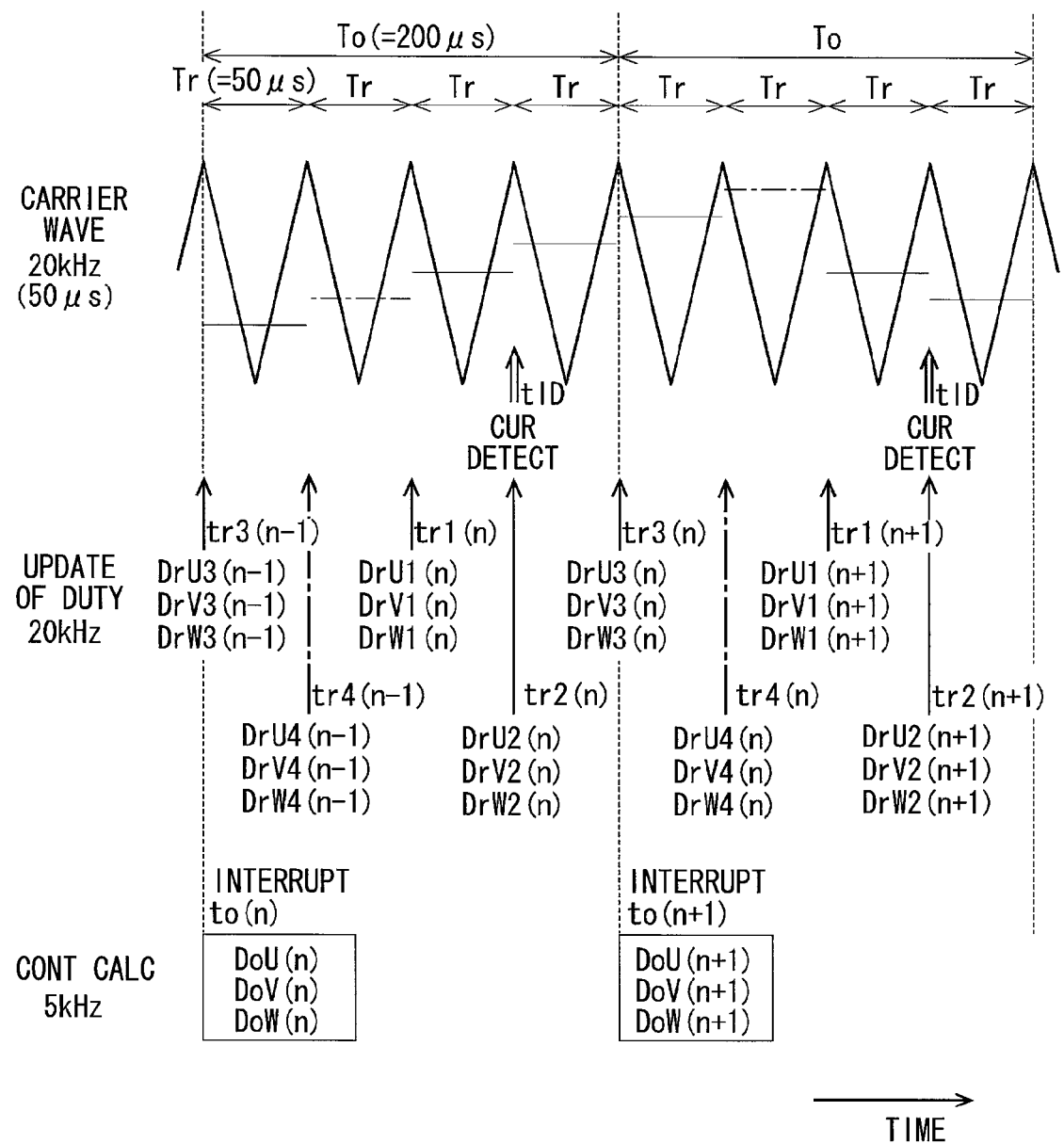
FIG. 26 is a timing chart showing a control process and an update of the duty value according to the fifth embodiment.

As shown in FIG. 26, in the fifth embodiment, the update period of the update duty value Dr is one-fourth of the calculation period, which is similar to the third and fourth embodiments. Further, the calculation method of the update duty value Dr is similar to the third and fourth embodiments.

In the fifth embodiment, the control calculation time to and the update time tr1-tr4 are disposed at a peak of the carrier wave, which is different from the bottom of the carrier wave in the third and fourth embodiments. Accordingly, the current detection time tID coincides with the second update time tr2. Specifically, the current is detected at time when the update duty value is switched from the first update duty value Dr1 to the second update duty value Dr2.

In the above case, when the current is detected in three phases, it is necessary to satisfy a condition that both of the first update duty value Dr1 and the second update duty value Dr2 before and after the current detection time tID are equal to or smaller than the upper duty limit DL. Accordingly, in a flowchart of FIG. 27, it is determined whether the B pattern lower shift process is executed, which is shown in FIG. 23.

Figure 27:
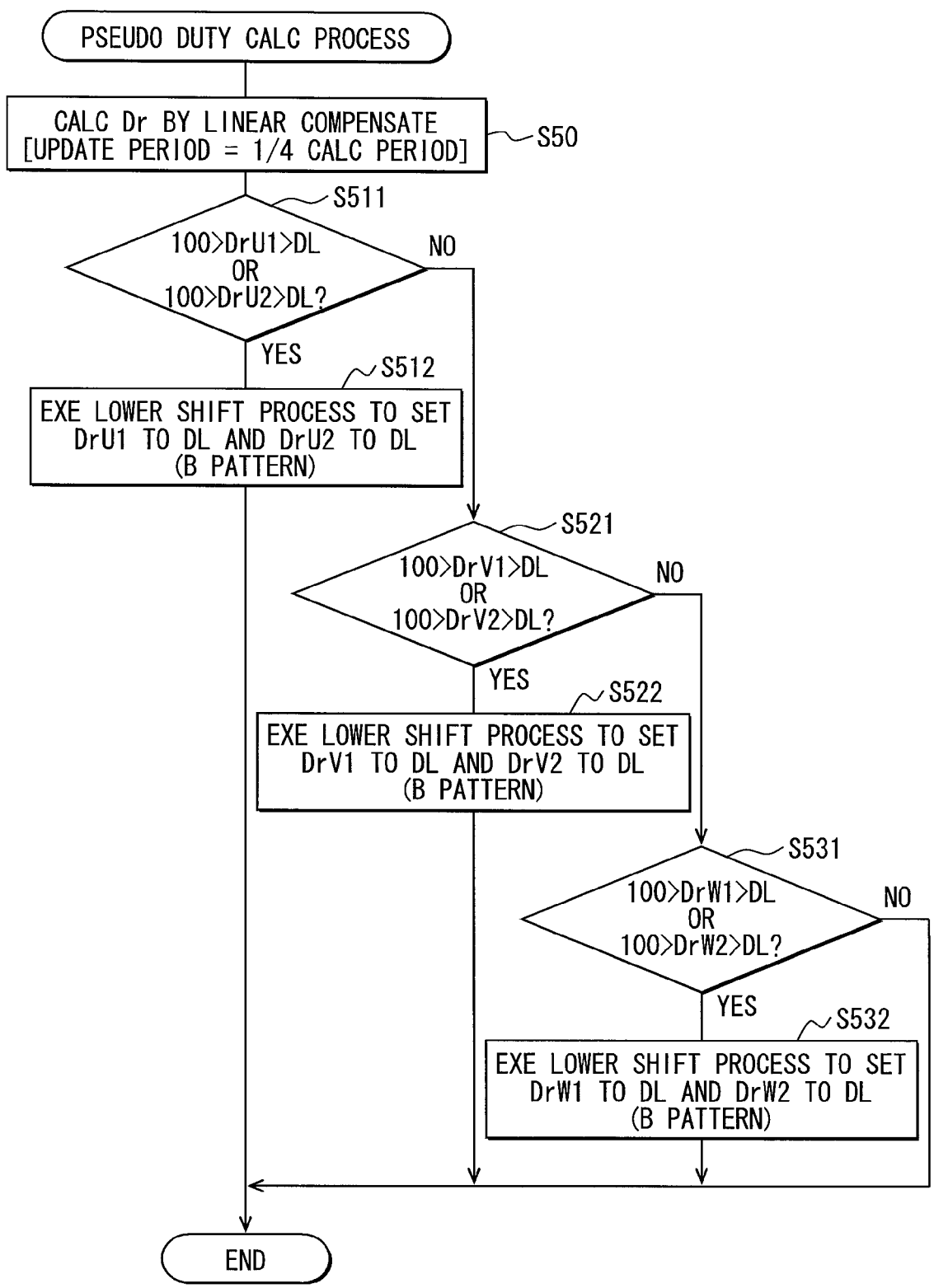
FIG. 27 is a flowchart showing a pseudo duty calculation process according to the fifth embodiment.

As shown in FIG. 27, in the pseudo duty calculation process according to the fifth embodiment, the update duty value Dr1 to Dr4 of each phase is calculated by the linear compensation method at step S50. Then, the first and second update duty values of each phase are checked in turn at steps S511 to S531.

At step S511, it is determined whether the first updated duty value DrU1 or the second update duty value DrU2 of the U phase exceeds the upper duty limit DL and is disposed in a prohibition range, which is smaller than 100. When at least one of the first updated duty value DrU1 and the second update duty value DrU2 is disposed in the prohibition range, i.e., when the determination in step S511 is "YES," it goes to step S512, and at step S512, the B pattern lower shift process is executed.

When both of the first updated duty value DrU1 and the second update duty value DrU2 are not disposed in the prohibition range, i.e., when the determination in step S511 is "NO," it goes to step S521. At step S521, it is determined whether the first updated duty value DrV1 or the second update duty value DrV2 of the V phase exceeds the upper duty limit DL and is disposed in a prohibition range, which is smaller than 100. When at least one of the first updated duty value DrV1 and the second update duty value DrV2 is disposed in the prohibition range, i.e., when the determination in step S521 is "YES," it goes to step S522, and at step S522, the B pattern lower shift process is executed.

When both of the first updated duty value DrV1 and the second update duty value DrV2 of the V phase are not disposed in the prohibition range, i.e., when the determination in step S521 is "NO," it goes to step S531. At step S531, it is determined whether the first updated duty value DrW1 or the second update duty value DrW2 of the W phase exceeds the upper duty limit DL and is disposed in a prohibition range, which is smaller than 100. When at least one of the first updated duty value DrW1 and the second update duty value DrW2 is disposed in the prohibition range, i.e., when the determination in step S531 is "YES," it goes to step S532, and at step S532, the B pattern lower shift process is executed.

When both of the first updated duty value DrW1 and the second update duty value DrW2 of the W phase are not disposed in the prohibition range, i.e., when the determination in step S531 is "NO," the pseudo duty calculation process ends. In this case, the first updated duty values DrU1, DrV1, DrW1 and the second update duty values DrU2, DrV2, DrW2 are output without correcting.

The B pattern lower shift process is similar to FIG. 25 according to the fourth embodiment.

In the fifth embodiment, even when the current is detected at time when the update duty value is switched, it is determined whether both of the update duty values before and after switching are disposed in the prohibition range. Thus, the fifth embodiment provides the effects of the first to fourth embodiments.

Sixth Embodiment

Figure 28:
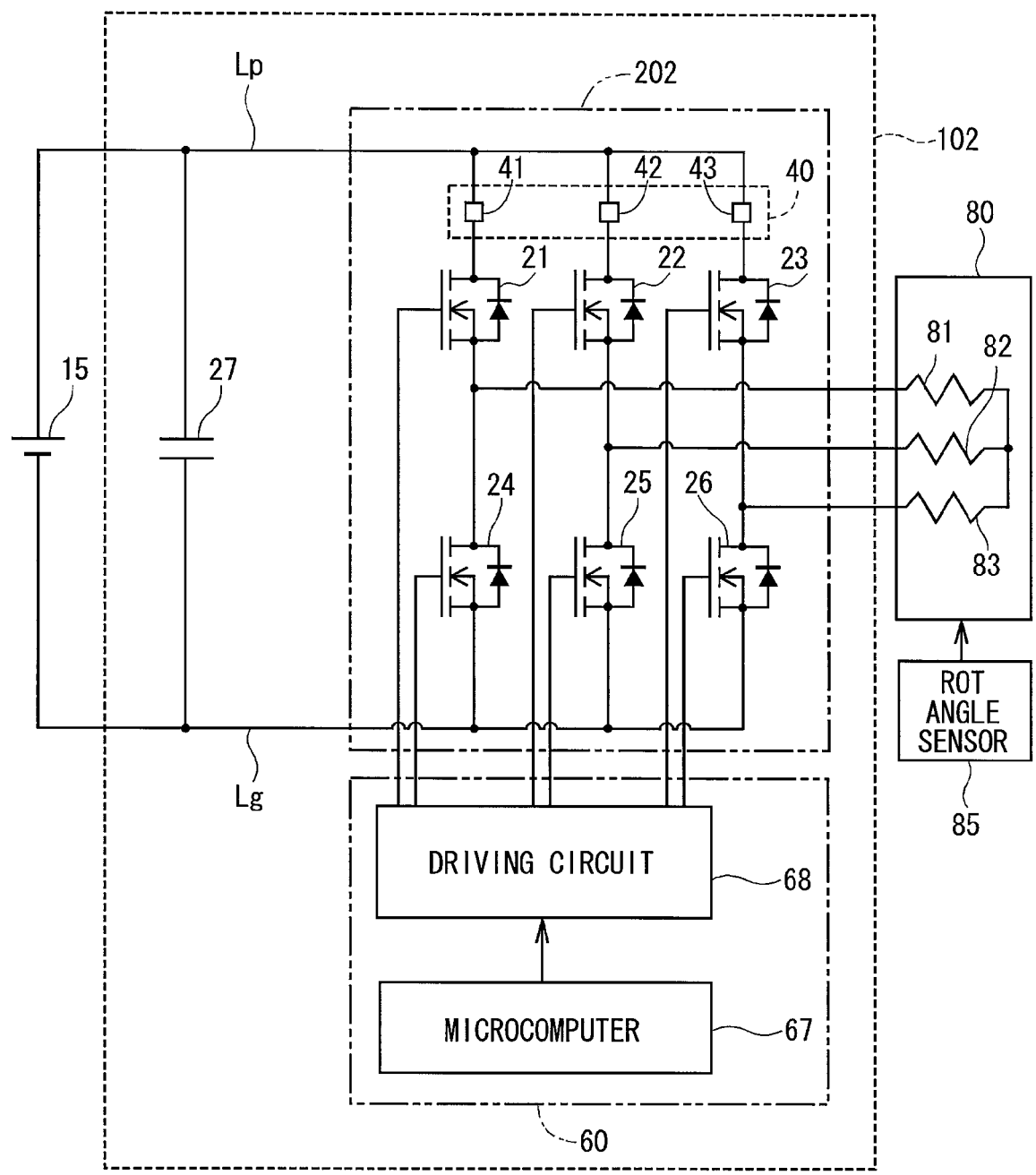
FIG. 28 is a diagram showing a controller for a three-phase rotary device according to a sixth embodiment.

Next, a sixth embodiment will be explained with reference to FIG. 28.

In a ECU 102 according to the sixth embodiment, the Shunt resistors 41-43 of the inverter 202 are disposed between the upper MOSFETS 21-23 and the power source line Lp, respectively, which is different from the ECU 101 according to the first embodiment. Accordingly, in the sixth embodiment, the upper MOSFETS 21-23 correspond to the detection side switching device.

The control calculation process and the pseudo duty calculation process according to the sixth embodiment are opposite to the first to fifth embodiments.

When the current is detected by the three-phase current detection method, in the sixth embodiment, the lower duty limit in a case where the V7 zero voltage vector period becomes the minimum detection time is considered, which corresponds to the upper duty limit in a case where the V0 zero voltage vector period becomes the minimum detection time according to the first to fifth embodiments. The update duty value Dr of each phase is shifted on an upper side so that the V7 zero voltage vector period, in which the upper MOSFETS of all three phases turn on, becomes equal to or larger than the minimum detection time.

Specifically, the minimum update duty value Dr among the update duty values of three phases is corrected to be the lower duty limit at the current detection time tID. In this case, the upper shift amount is added to the update duty values of other two phases.

When the current is detected by the two-phase current detection method, in the sixth embodiment, the update duty value Dr of each phase is shifted to the lower side so that the current is detected in V2, V4 and V6 even number voltage vector generation periods, in which the upper MOSFETS of two of three phases turn on.

Specifically, the minimum update duty value Dr among the update duty values of three phases is set to be zero % at the current detection time tID. Further, the update duty values of other two phases is changed to new update values of respective phases corresponding to the update time, at which the minimum update value becomes zero.

(Modifications)

The calculation period and the update frequency and the like according to the above embodiments are merely example numerical values. Thus, they may be different in the above embodiments as long as the update period Tr of the update duty value is one-m-th of the calculation period. Here, the m-th indicates the ordinal number equal to or larger than two.

In the above embodiments, the pseudo duty calculation is performed with a period shorter than the control calculation. Alternatively, the update duty value may be calculation preliminary in the control calculation process. Only the update may be performed with a period of one-m-th of the calculation period of To. The term "m" represents an integer equal to or larger than two.

The pseudo duty value for correcting the minimum update duty value among the update duty values of three phases may be substantially equal to the upper duty limit DL in the lower shift process executed by the pseudo duty calculation device. For example, the pseudo duty value may be a value smaller than the upper duty limit DL by 1%. Thus, the pseudo duty value may be smaller than the upper duty limit DL.

The current detection device may be different from the Shunt resistor as long as the current detection device detects the current flowing through the switching device on the high potential side or the low potential side in the electric power converter.

The switching device may be a device other than the MOSFET. For example, the switching device may be a field effect transistor other than the MOSFET or the IGBT.

The control unit of the ECU executes a d-q conversion process in the above embodiments. Alternatively, the control unit of the ECU may execute a process other than the d-q conversion process. Further, the processes in the carrier wave comparison device 57 and the like according to the above embodiments are performed by a software process in the micro computer 67. Alternatively, the processes may be performed by a hardware element.

The carrier wave is a triangle wave having an isosceles triangle shape so that a rising rate is equal to a falling rate in the above embodiments. Alternatively, the carrier wave may be different from the triangle wave. For example, the carrier wave may be a saw-tooth wave.

In the above embodiments, the number of phases in the multi-phase rotary device is three. Alternatively, the number of phases may be four or more.

In the above embodiments, the controller for the multi-phase rotary device is a control device of the motor in the electric power steering system. Alternatively, the controller may be used for a multi-phase motor or a control device of an electric power generator.

The above disclosure has the following aspects.

According to an example aspect of the present disclosure, a controller for a multi-phase rotary device includes: an electric power inverter for converting an electric power of a direct current power source by a pulse width modulation control method and for supplying a converted electric power to the multi-phase rotary device, the electric power inverter including a plurality of switching devices, which have a high voltage side switching device and a low voltage side switching device connected to each other in a bridge connection manner; a control calculation device including: a duty command device for calculating a duty command value, which relates to the pulse width modulation control method, with a predetermined calculation period; and a pseudo duty calculation device for calculating a update duty value based on the duty command value with an update period, which has a frequency M times larger than the calculation period, the M indicative of an integer equal to or larger than two, the control calculation device outputting the update duty value corresponding to a command voltage of the multi-phase rotary device; a carrier wave comparison device for comparing the update duty value with a carrier wave of the pulse width modulation control method and for generating an on-off signal of each switching device; and a current detection device for detecting current of each phase to be supplied to the multi-phase rotary device from the electric power inverter with the calculation period, the current detection device arranged between the low voltage side switching device and a negative terminal of the direct current power source or between the high voltage side switching device and a positive terminal of the direct current power source. The duty command device changes an average voltage of each phase corresponding to the duty command value so that an on-state time of a detection side switching device corresponding to the duty command value is equal to or longer than a minimum detection time for detecting the current of each phase with the current detection device. The detection side switching device is provided by one of the switching devices disposed on a current detection device side. The pseudo duty calculation device calculates the update duty value, which corresponds to a N-th duty command value, based on the N-th duty command value and a (N−1)-th duty command value in accordance with a ratio between the update period and the calculation period with a linear compensation method. The duty command device calculates the duty command value N times. The N indicates a natural number. The pseudo duty calculation device outputs a pseudo duty value when the on-state time of the detection side switching device of at least one of phases, which corresponds to the update duty value, is smaller than the minimum detection time. The pseudo duty value is prepared by changing the update duty value so as to detect the current of all phases other than the at least one of phases.

In the above controller, since the update duty value is calculated at the update period equal to one-M-th of the calculation period, the frequency of comparison between the update duty value and the carrier wave increases without increasing the interruption process of the duty command value. Further, the update duty value is calculated by the linear compensation method, which requires small calculation load. Accordingly, the controller can stably control the rotary device with reducing the calculation load.

Further, the duty command device changes the average voltage of each phase with respect to the duty command value in process for securing the current detection time. Further, the pseudo duty calculation device outputs the pseudo duty value with respect to the update duty value, which is calculated based on the duty command value by the linear compensation method, in the process for securing the current detection process.

Alternatively, the multi-phase rotary device may be a three-phase rotary device. The current detection device is disposed between the low voltage side switching device and the negative terminal of the direct current source. The duty command device changes the average voltage of three phases corresponding to the duty command value so that the current is detected in a longer one of (i) the on-state time of the low voltage side switching devices of all three phases corresponding to the duty command value and (ii) the on-state time of the low voltage side switching devices of two phases corresponding to the duty command value. The pseudo duty calculation device outputs the pseudo duty value, which is prepared by increasing the update duty value of each phase so as to detect the current of all phases other than the at least one of phases within the on-state time of the low voltage side switching devices of two phases other than the at least one of phases, when the on-state time of the low voltage side switching device of at least one of phases, which corresponds to the update duty value, is smaller than the minimum detection time. In this case, the process for changing the average voltage in order to secure the current detection time is performed primarily with respect to the duty command value. Then, the process for changing the average voltage is secondly performed with respect to the update duty value at the timing of detecting current. Thus, the current detection time is appropriately secured. Thus, the current supplied to the multi-phase rotary device from the electric power inverter is surely detected.

Alternatively, the multi-phase rotary device may be a three-phase rotary device. The current detection device is disposed between the low voltage side switching device and the negative terminal of the direct current source. The duty command device changes the average voltage of three phases corresponding to the duty command value so that the current is detected in a longer one of (i) the on-state time of the low voltage side switching devices of all three phases corresponding to the duty command value and (ii) the on-state time of the low voltage side switching devices of two phases corresponding to the duty command value. The pseudo duty calculation device outputs the pseudo duty value, which is prepared by decreasing the update duty value of each phase so as to make the on-state time of the low voltage side switching devices of all three phases longer than the minimum detection time, when the on-state time of the low voltage side switching device of at least one of phases, which corresponds to the update duty value, is smaller than the minimum detection time. In this case, the process for changing the average voltage in order to secure the current detection time is performed primarily with respect to the duty command value. Then, the process for changing the average voltage is secondly performed with respect to the update duty value at the timing of detecting current. Thus, the current detection time is appropriately secured. Thus, the current supplied to the multi-phase rotary device from the electric power inverter is surely detected.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A controller for a multi-phase rotary device comprising:
   an electric power inverter for converting an electric power of a direct current power source by a pulse width modulation control method and for supplying a converted electric power to the multi-phase rotary device, the electric power inverter including a plurality of switching devices, which have a high voltage side switching device and a low voltage side switching device connected to each other in a bridge connection manner;
   a control calculation device including: a duty command device for calculating a duty command value, which relates to the pulse width modulation control method, with a predetermined calculation period; and a pseudo duty calculation device for calculating a update duty value based on the duty command value with an update period, which has a frequency M times larger than the calculation period, the M indicative of an integer equal to or larger than two, the control calculation device outputting the update duty value corresponding to a command voltage of the multi-phase rotary device;
   a carrier wave comparison device for comparing the update duty value with a carrier wave of the pulse width modulation control method and for generating an on-off signal of each switching device; and
   a current detection device for detecting current of each phase to be supplied to the multi-phase rotary device from the electric power inverter with the calculation period, the current detection device arranged between the low voltage side switching device and a negative terminal of the direct current power source or between the high voltage side switching device and a positive terminal of the direct current power source, wherein:
   the duty command device changes an average voltage of each phase corresponding to the duty command value so that an on-state time of a detection side switching device corresponding to the duty command value is equal to or longer than a minimum detection time for detecting the current of each phase with the current detection device;
   the detection side switching device is provided by one of the switching devices disposed on a current detection device side;
   the pseudo duty calculation device calculates the update duty value, which corresponds to a N-th duty command value, based on the N-th duty command value and a (N−1)-th duty command value in accordance with a ratio between the update period and the calculation period with a linear compensation method;
   the duty command device calculates the duty command value N times;

the N indicates a natural number;

the pseudo duty calculation device outputs a pseudo duty value when the on-state time of the detection side switching device of at least one of phases, which corresponds to the update duty value, is smaller than the minimum detection time; and the pseudo duty value is prepared by changing the update duty value so as to detect the current of all phases other than the at least one of phases.

2. The controller according to claim 1, wherein:

the multi-phase rotary device is a three-phase rotary device;

the current detection device is disposed between the low voltage side switching device and the negative terminal of the direct current power source;

the duty command device changes the average voltage of three phases corresponding to the duty command value so that the current is detected in a longer one of (i) the on-state time of the low voltage side switching devices of all three phases corresponding to the duty command value and (ii) the on-state time of the low voltage side switching devices of two phases corresponding to the duty command value; and the pseudo duty calculation device outputs the pseudo duty value, which is prepared by increasing the update duty value of each phase so as to detect the current of all phases other than the at least one of phases within the on-state time of the low voltage side switching devices of two phases other than the at least one of phases, when the on-state time of the low voltage side switching device of at least one of phases, which corresponds to the update duty value, is smaller than the minimum detection time.

3. The controller according to claim 1, wherein:

the multi-phase rotary device is a three-phase rotary device;

the current detection device is disposed between the low voltage side switching device and the negative terminal of the direct current power source;

the duty command device changes the average voltage of three phases corresponding to the duty command value so that the current is detected in a longer one of (i) the on-state time of the low voltage side switching devices of all three phases corresponding to the duty command value and (ii) the on-state time of the low voltage side switching devices of two phases corresponding to the duty command value; and the pseudo duty calculation device outputs the pseudo duty value, which is prepared by decreasing the update duty value of each phase so as to make the on-state time of the low voltage side switching devices of all three phases longer than the minimum detection time, when the on-state time of the low voltage side switching device of at least one of phases, which corresponds to the update duty value, is smaller than the minimum detection time.

* * * * *